(12) United States Patent
Sugiyama et al.

(10) Patent No.: US 11,209,587 B2
(45) Date of Patent: Dec. 28, 2021

(54) LIGHT GUIDING LAMINATE USING ANISOTROPIC OPTICAL FILM AND PLANAR LIGHT SOURCE DEVICE USING THE SAME

(71) Applicant: TOMOEGAWA CO., LTD., Tokyo (JP)

(72) Inventors: Masahide Sugiyama, Shizuoka (JP); Masao Kato, Shizuoka (JP); Tsubasa Sakano, Shizuoka (JP); Shogo Suga, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 199 days.

(21) Appl. No.: 16/497,855

(22) PCT Filed: Mar. 30, 2018

(86) PCT No.: PCT/JP2018/013527
§ 371 (c)(1),
(2) Date: Sep. 26, 2019

(87) PCT Pub. No.: WO2018/181853
PCT Pub. Date: Oct. 4, 2018

(65) Prior Publication Data
US 2020/0033525 A1    Jan. 30, 2020

(30) Foreign Application Priority Data

Mar. 31, 2017   (JP) .............................. JP2017-073193

(51) Int. Cl.
*G02F 1/1335*       (2006.01)
*F21V 8/00*         (2006.01)

(52) U.S. Cl.
CPC .......... *G02B 6/0038* (2013.01); *G02B 6/0056* (2013.01)

(58) Field of Classification Search
CPC ......... G02F 1/133504; G02F 1/133606; G02B 5/0236; G02B 5/0257
See application file for complete search history.

(56) References Cited

U.S. PATENT DOCUMENTS

| 2011/0286222 A1 | 11/2011 | Zane et al. |
| 2014/0198287 A1 | 7/2014 | Masaya et al. |
(Continued)

FOREIGN PATENT DOCUMENTS

| CN | 104777547 | 7/2015 |
| JP | 2003-203514 A | 7/2003 |
(Continued)

OTHER PUBLICATIONS

English Translation of International Preliminary Report on Patentability of PCT/JP2018/013527 dated Oct. 10, 2019.
(Continued)

*Primary Examiner* — Andrew J Coughlin
(74) *Attorney, Agent, or Firm* — Muncy, Geissler, Olds & Lowe, P.C.

(57) ABSTRACT

According to the present invention, a light guiding laminate including a light guide plate with good visibility and an anisotropic optical film, and a planar light source device including the light guiding laminate and a light source are provided.
There are a light guiding laminate including a light guide plate which has: a light emission surface through which light incident from an end face is bent and emitted in a surface direction, and an angle at which emission intensity in the light emission surface is maximum, the angle being 20° to 60° with respect to a perpendicular direction to the light emission surface; and an anisotropic optical film which is laminated directly or via another layer and has diffusibility changing depending on an angle of incident light with respect to the light emission surface, in which an opposite (Continued)

surface which is a surface on an opposite side to the light emission surface of the light guide plate has a plurality of concave or convex structures having a size of 50 µm or less and a height or a depth of 50 µm or less, the anisotropic optical film has a matrix region and a structural region formed of a plurality of structures, and linear transmittance of the anisotropic optical film, which is an amount of transmitted light in a linear direction of light incident on the anisotropic optical film/an amount of incident light, is 30% or less at an angle at which the emission intensity of the light guide plate is maximum, and a planar light source device using the light guiding laminate.

16 Claims, 13 Drawing Sheets

(56) References Cited

U.S. PATENT DOCUMENTS

| | | |
|---|---|---|
| 2014/0293189 A1 | 10/2014 | Fukunaga |
| 2015/0338698 A1 | 11/2015 | Masahide et al. |
| 2016/0077246 A1* | 3/2016 | Kusama ............... G02B 5/0257 |
| | | 359/599 |
| 2017/0192137 A1 | 7/2017 | Sakano |
| 2017/0205663 A1 | 7/2017 | Fukunaga |
| 2017/0293054 A1* | 10/2017 | Kusama ............... G02B 5/0278 |

FOREIGN PATENT DOCUMENTS

| | | |
|---|---|---|
| JP | 2012-042820 A | 3/2012 |
| JP | 2014-191228 A | 10/2014 |
| JP | 2015-191178 A | 11/2015 |
| JP | 6050712 B2 | 12/2016 |
| WO | 2008/038754 A1 | 4/2008 |

OTHER PUBLICATIONS

The extended European search report of the corresponding EP application No. 18774992.4 dated Nov. 23, 2020.

Office Action of the corresponding Chinese Patent Application 201880008385.2 dated Apr. 9, 2020 and partial English translation thereof.

* cited by examiner (a)

(b)

(c)

(a)

(b)

(a) INCIDENT ANGLE OF EMITTED LIGHT OF LIGHT GUIDE PLATE ON ANISOTROPIC OPTICAL FILM (b) WHEN SCATTERING CENTRAL AXIS IS 20° TO 60°

(c)

60(70) SAMPLE (a) DOT STRUCTURE OF LIGHT GUIDE PLATE A (b) DOT STRUCTURE OF LIGHT GUIDE PLATE B (c) DOT STRUCTURE OF LIGHT GUIDE PLATE C (d) GROOVE STRUCTURE OF LIGHT GUIDE PLATE D

LIGHT GUIDING LAMINATE USING ANISOTROPIC OPTICAL FILM AND PLANAR LIGHT SOURCE DEVICE USING THE SAME

TECHNICAL FIELD

The present invention relates to a light guiding laminate and a planar light source device using the same.

BACKGROUND ART

Conventionally, a liquid crystal display device uses an edge light type planar light source device 10 in which a light source 11, a light guide plate 12, and a prism lens 13 are combined as shown in FIG. 1(a). However, in the case of using the prism lens, unevenness or interference is likely to occur due to the prism, and thus transmittance also decreases. In addition, when the edge light type planar light source device 10 is used as a front light, it has the disadvantage that lines of grooves of a prism can be seen. Therefore, attempts have been made to prevent the unevenness or the interference and to compensate for the drawback that the lines of the grooves of the prism can be seen, by using a diffusion film 24 in combination with the prism lens (FIG. 1(b)). However, there have been problems in that the configuration of the device becomes complicated or significant backscattering or stray light occurs on surfaces of each layer to cause a reduction in luminance.

In order to solve these problems, as a method of using a light scattering effect by a light guide plate 32 and an anisotropic scattering film 34 (anisotropic light scattering film or anisotropic scattering member) as shown in FIG. 1(c), for example, Patent Literature 1 proposes a reflection type liquid crystal display device in which a light guide plate having a groove structure (111 in FIG. 4(a)) and an anisotropic scattering member are combined, Patent Literature 2 proposes a front illumination device in which a light guide plate having a prism array structure 108 and an anisotropic light scattering film are combined as shown in FIG. 4(b), or Patent Literature 3 proposes an anisotropic surface light emitting unit in which a surface light emitting means light guide plate and an anisotropic imparting means having an uneven pattern formed sheet are combined.

CITATION LIST

Patent Literature

Patent Literature 1: JP 6050712 B2
Patent literature 2: JP 2003-203514 A
Patent Literature 3: JP 2012-42820 A

SUMMARY OF INVENTION

Technical Problem

In the device using the light guide plate and the anisotropic light scattering film (anisotropic scattering member) proposed in Patent literature 1 and Patent literature 2, incident light from the light source is linearly guided by the structure of the light guide plate. That is, since the diffusibility of incident light in the light guide plate surface is low, in order to obtain uniform brightness in the light guide plate surface, the light source needs to be disposed at a high density, and the efficiency is very low. That is, since the light emission characteristics of the light guide plate deteriorate, there is a problem in that the visibility decreases. In addition, in the anisotropic surface light emitting unit in which the surface light emitting means light guide plate and the anisotropy imparting means having the uneven pattern formed sheet which are disclosed in Patent Literature 3 are combined, the uneven pattern formed sheet has no incident angle dependency, so there is a problem in that light transmittance in a front direction tends to decrease and visibility decreases. Therefore, an object of the present invention is to provide a light guiding laminate including a light guide plate and an anisotropic optical film capable of improving visibility, and a planar light source device including the light guiding laminate and a light source.

Solution to Problem

The present invention (1) provides a light guiding laminate including:

a light guide plate which has a light emission surface through which light incident from an end face is bent and emitted in a surface direction, and an angle at which emission intensity in the light emission surface is maximum, the angle being 20° to 60° with respect to a perpendicular direction to the light emission surface; and an anisotropic optical film which is laminated directly or via another layer and has diffusibility changing depending on an angle of incident light with respect to the light emission surface, in which an opposite surface which is a surface on an opposite side to the light emission surface of the light guide plate has a plurality of concave or convex structures having a size of 50 μm or less and a height or a depth of 50 μm or less, the anisotropic optical film has a matrix region and a structural region formed of a plurality of structures, and linear transmittance of the anisotropic optical film, which is an amount of transmitted light in a linear direction of light incident on the anisotropic optical film/the amount of incident light, is 30% or less at an angle at which the emission intensity of the light guide plate is maximum.

The present invention (2) provides the light guiding laminate according to (1), in which a scattering central axis angle with respect to a normal direction of the anisotropic optical film is inclined toward the normal direction with respect to the angle at which the emission intensity is maximum, and a difference between the scattering central axis angle and the angle at which the emission intensity is maximum is within 20°.

The present invention (3) provides the light guiding laminate according to (2), in which the scattering central axis angle is continuously changed from a position close to the light source to a position far from the light source.

The present invention (4) provides the light guiding laminate according to any one of (1) to (3), in which the plurality of structures has a plate shape.

The present invention (5) provides the light guiding laminate according to any one of (1) to (4), in which the linear transmittance in the normal direction of the anisotropic optical film is 60% or more.

The present invention (6) provides the light guiding laminate according to any one of (1) to (5), in which a structure of the opposite surface of the light guide plate has a concave shape.

The present invention (7) provides the light guiding laminate according to any one of (1) to (6), in which the concave or convex structure is sealed, and an inside of the sealing is filled with at least one of gas, liquid, solid, and vacuum.

The present invention (8) provides the light guiding laminate according to (1) to (7), in which the other layer is at least one of a polarizing plate, a retardation plate, or both of them.

The present invention (9) provides a planar light source device including the light guiding laminate according to any one of (1) to (7) and a light source.

Advantageous Effects of Invention

According to the present invention, the light guiding laminate including the light guide plate with good visibility and the anisotropic optical film, and the planar light source device including the light guiding laminate and the light source are provided.

DESCRIPTION OF EMBODIMENTS

Figure 1:
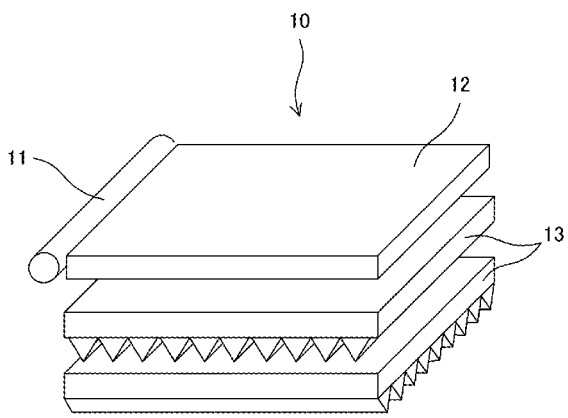
FIG. 1 is an explanatory diagram showing a planar light source device.
Figure 1:
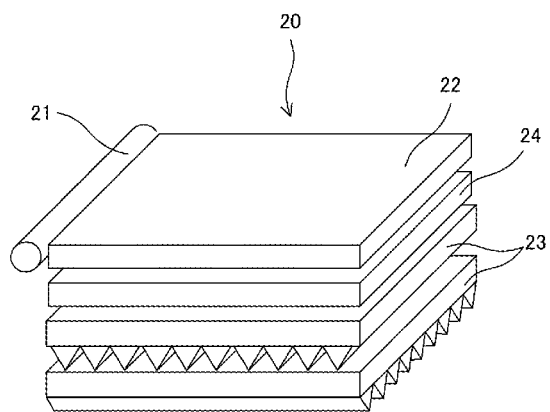
Figure 1:
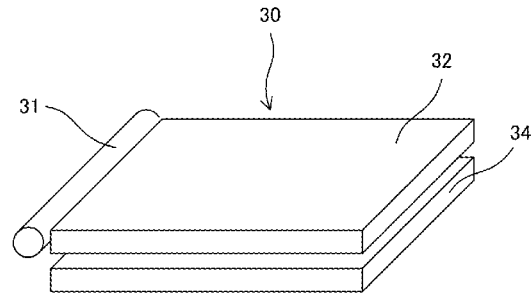

A light guiding laminate according to the present invention will be described in detail below.

1. Definition of Main Terms

A "low refractive index region" and a "high refractive index region" are regions formed by a local difference in refractive index of materials constituting an anisotropic optical film according to the present invention, and indicate whether the refractive index is relatively lower or higher with respect to each other. These regions are formed when the material forming the anisotropic optical film is cured.

An "aspect ratio" is a value obtained by dividing an average value (average long diameter) of long diameters of a plurality of structures which are structural regions constituting the anisotropic optical film of the present invention by an average value (average short diameter) of short diameters thereof. The average value of the long diameters (average long diameter) and the average value of the short diameters (average short diameter) are average values obtained by observing a surface of the anisotropic optical film with a microscope and measuring short diameters and long diameters of 100 structures arbitrarily selected.

"Linear transmittance" generally relates to linear transmittance of light incident on the anisotropic optical film, and is a ratio of the amount of transmitted light in a linear direction and the amount of incident light when the light is incident from a certain angle of incident light, which is represented by the following equation.

Linear transmittance (%)=(amount of linearly transmitted light/amount of incident light)×100

A "scattering central axis" means a direction in which light diffusibility coincides with the angle of incident light having substantially symmetry with respect to the angle of incident light when the angle of incident light on the anisotropic optical film is changed. The "having substantially symmetry" is that when the scattering central axis has an inclination with respect to a normal direction of the film, an optical profile described below, which is optical characteristics, does not have symmetry strictly.

The scattering central axis is based on the optical profile obtained by measuring the amount of linearly transmitted light with respect to the angle of incident light, and can be the angle of incident light having the substantially symmetry in the optical profile.

In the present invention, both "scattering" and "diffusion" are used without distinction, and both have the same meaning. In addition, the meaning of "photopolymerization" and "photocuring" is that a photopolymerizable compound undergoes a polymerization reaction by light, and both are used synonymously.

Hereinafter, preferred embodiments of the present invention will be described in detail with reference to the accompanying drawings. In the present specification and the drawings, components to which the same reference numerals are attached have substantially the same structure or function.

2. Light Guiding Laminate 2-1. Overall Structure

A light guiding laminate (for example, FIGS. 3(a) to 3(e)) according to the present invention at least includes a light guide plate 101 and an anisotropic optical film 103 whose light diffusibility is changed depending on an angle of incident light.

Another layer may be provided between the light guide plate and the anisotropic optical film or on each surface. The another layer is not specifically limited, but examples thereof can include a sealing member 107, a polarizing plate 105, a retardation plate 104, or both the polarizing plate 105 and the retardation plate 104.

Figure 3:
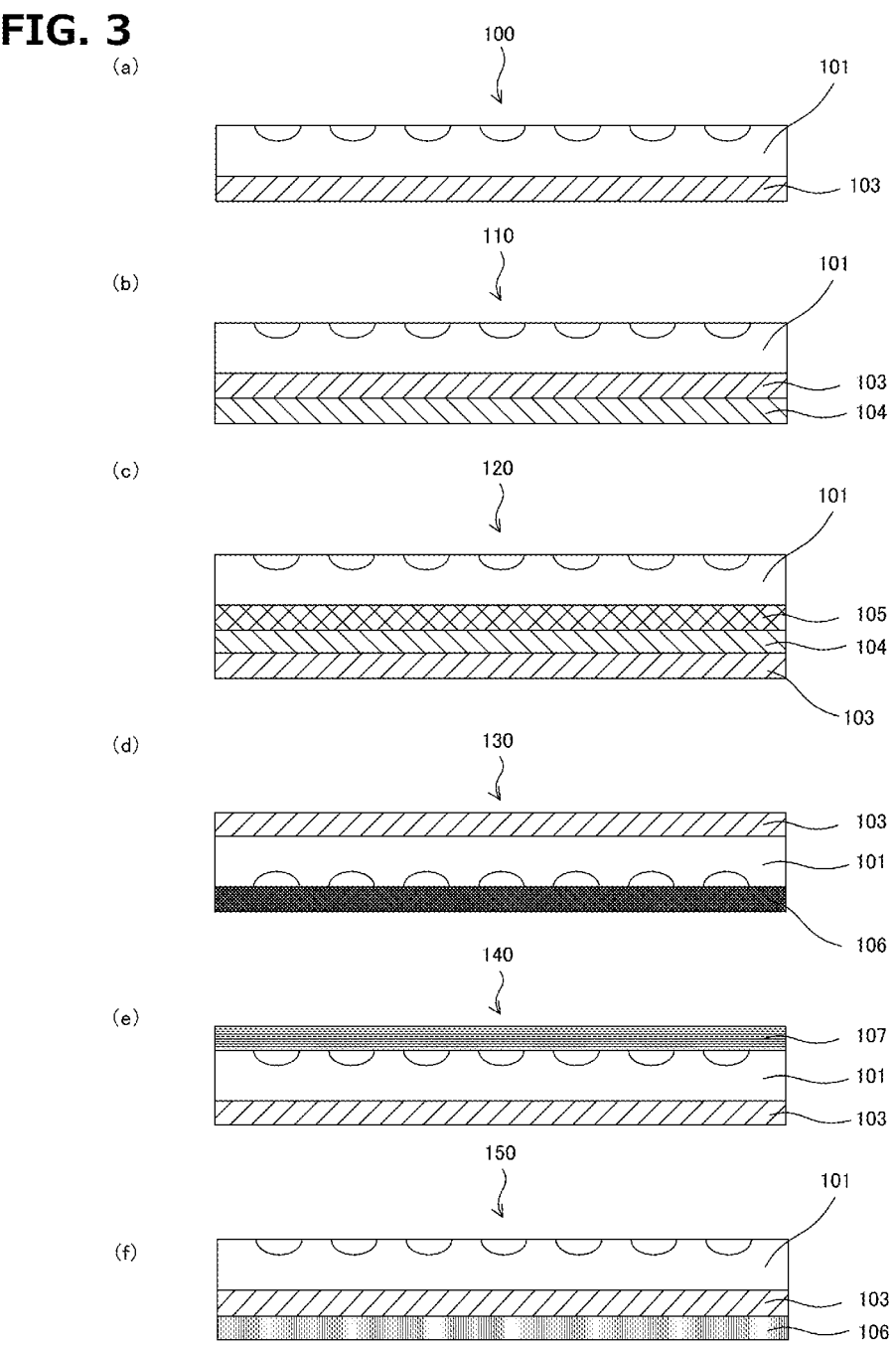
FIG. 3 is a side cross-sectional view showing a structure of a light guiding laminate.
Figure 4:
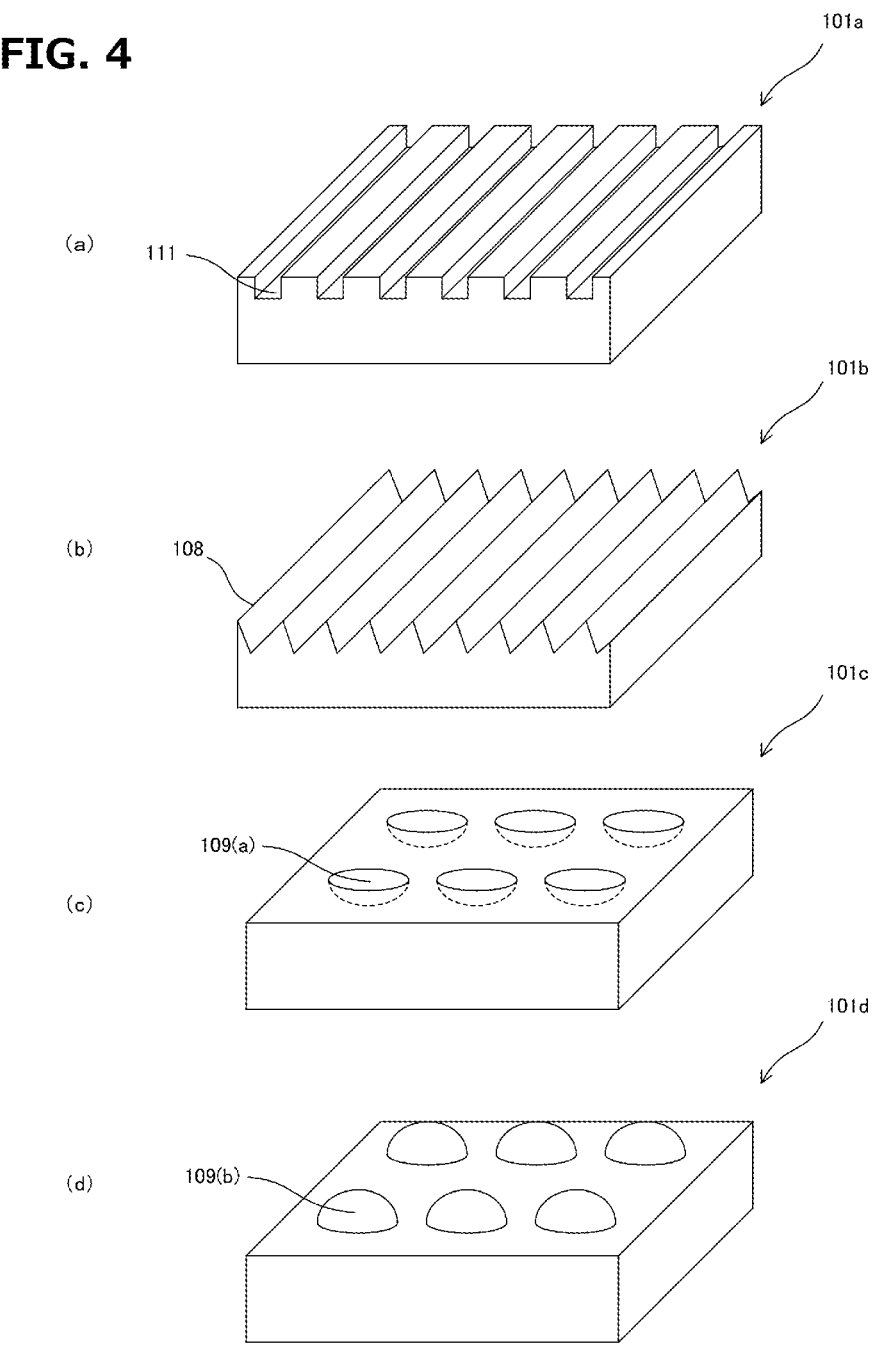
FIG. 4 is an enlarged view showing a surface structure of a light guide plate.
Figure 5:
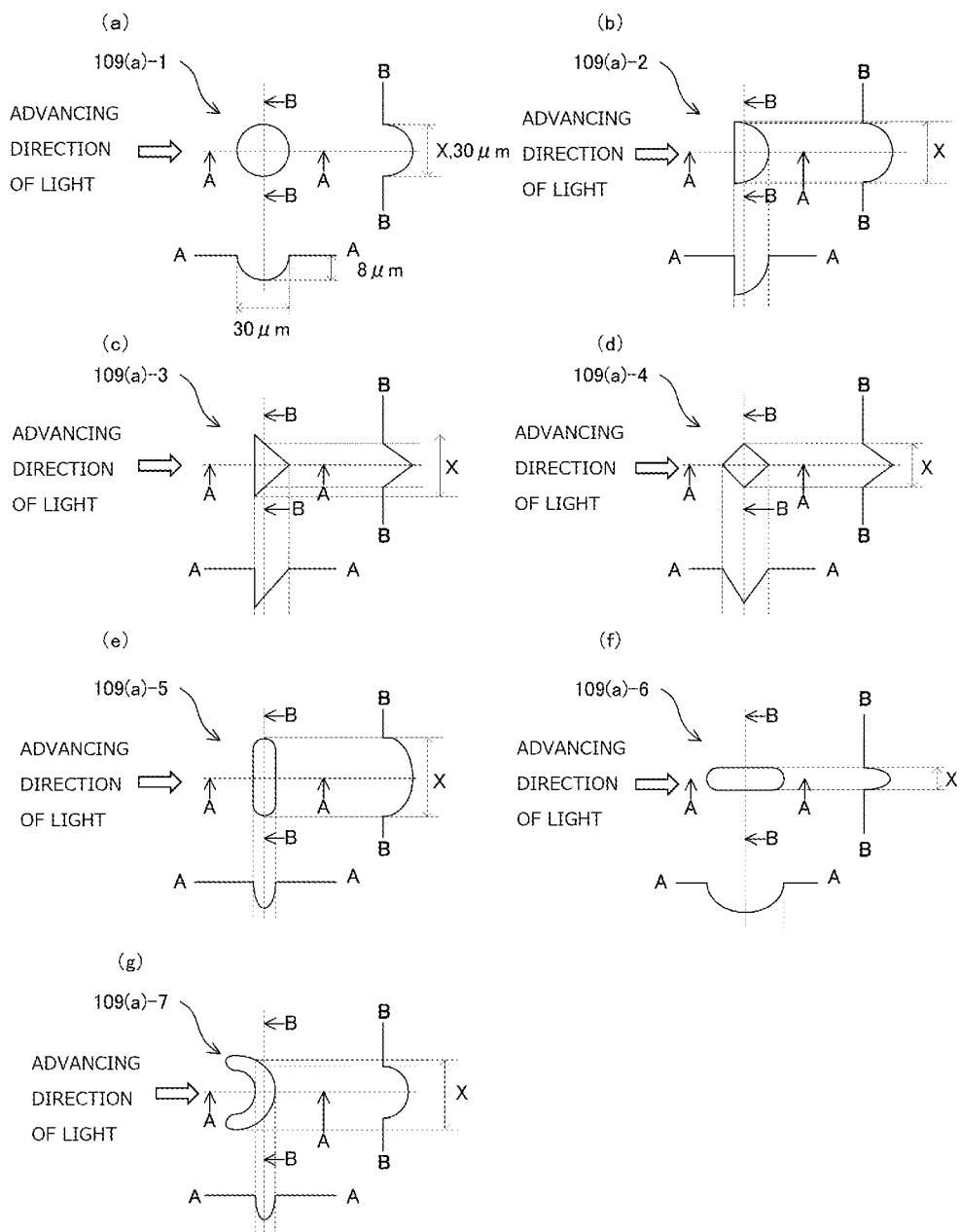
FIG. 5 is a top view and a cross-sectional view showing, as an example, shapes of concave dot structures.

The sealing member 107 has a structure formed on the surface of the light guide plate to reflect and refract light and emit the light to the outside, and is used for avoiding, for example, a decrease in optical characteristics and the like due to adhesion of dirt and scratches on the light guide plate having a plurality of concave lens type dot structures, and a sealing film, an adhesive or the like is used (FIG. 3 (e)).

Further, the polarizing plate 105 is a plate which polarizes light emitted from the light guide plate in a specific direction or passes only the polarized light, and for example, a planar light source device according to the present invention is used as a light source for a liquid crystal display device.

In addition, the retardation plate 104 is a material used for optical compensation of, for example, a liquid crystal display, and is used for preventing occurrence of viewing angle dependency such as coloring of display caused by an optical distortion due to birefringence or modulation due to a viewing angle direction.

Further, an adhesive layer (not shown) for fixing the anisotropic optical film, the polarizing plate, or the like can also be provided. A known adhesive can be used as the adhesive layer.

In addition, in the case where the planar light source device according to the present invention is used as a backlight (FIG. 3(d)), a reflector 106 can be provided on an opposite surface which is a surface opposite to the light emission surface of the light guide plate 101. In this case, the anisotropic optical film 103 can be provided on the light emission surface of the light guide plate.

Further, as shown in FIG. 3(f), the anisotropic optical film 103 may be provided on the light emission surface of the light guide plate, and the reflector 106 may also be provided on the surface of the anisotropic optical film 103.

2-2. Each Part 2-2-1. Light Guide Plate

Figure 2:
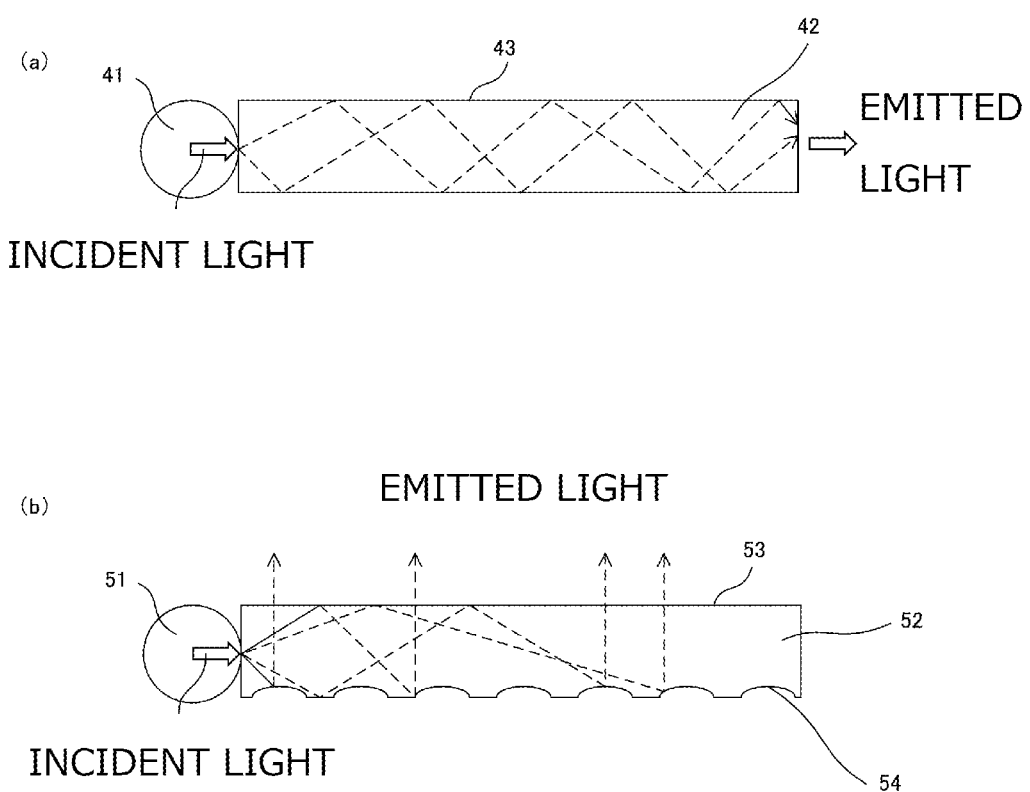
FIG. 2 is a schematic diagram showing progressing of light in a light guide plate.

FIG. 2(a) shows a light source 41 provided on a light guide plate 42 and progressing of light in the plate at the time of incidence of light. The light that is incident into the light guide plate progresses while being totally reflected on an inner surface of the light guide plate 42 and is emitted from an end face on an opposite side to the light source 41. The light is totally reflected on the inner surface of the light guide plate, and therefore cannot be emitted from a light emission surface 43. In order to uniformly extract light from the light emission surface, for example, as shown in FIG. 2(b), a processed portion 54 having a concave structure is provided on one main surface of a light guide plate 52. The progressing of light in the light guide plate 52 is reflected at different angles by the processed portion 54, and can be reflected, refracted, and emitted from the light emission surface 53.

2-2-1-1. Structure

The light guide plate is constituted by transparent members such as a plate and a film, or a laminate of these members. The material of the light guide plate may be a transparent member, and may be, for example, a transparent resin or glass, but is preferably a transparent resin and more preferably a highly transparent thermoplastic resin. Examples of the highly transparent thermoplastic resin include polyolefin resins, vinyl resins, acrylic resins, polyamide resins, polyester resins, polycarbonate resins, polyurethane resins, polyether resins and the like. Among them, the polycarbonate resins, the acrylic resins, and the urethane resins having no absorption region of wavelength in a visible light region are preferable from the viewpoint of transparency.

As described above, the light incident on the light guide plate from the light source installed on a side surface of the light guide plate progresses in the light guide plate while repeating total reflection on the inner surface of the light guide plate. The light guide plate is provided with a plurality of processed portions which change the reflection angle when light is totally reflected, and the light whose reflection angle is changed by the processed portion is emitted from the emission surface to the outside. The processed portion may be provided on one of the main surfaces of the light guide plate, that is, on the opposite surface which is the surface opposite to the light emission surface.

The structure of the processed portion which changes the reflection angle of light is not particularly limited. However, according to the present invention, the processed portion preferably has a plurality of dot structures that are concave or convex structures, and more preferably has a concave dot structure. These structures may be used alone or in combination of a plurality of structures. The processed portion preferably has a concave or convex dot structure having a size of 50 μm or less and a height or a depth of 50 μm or less, and more preferably has a concave dot structure having a size and a depth of 50 μm or less. In this way, when the light guiding laminate according to the present invention is used as a front light, it is possible to prevent the processed portion structure from being visually recognized.

Hereinafter, the case where the processed portion structure is the concave dot structure as a preferred example will be described in detail.

As described above, the concave dot structure preferably has a size and a depth of 50 μm or less.

Examples of the concave dot structure are shown in FIGS. 5(a) to 5(g). The concave dot structure is not limited to these. Among these, FIG. 5 (a) which is hemispherical is preferable. By doing so, light can be easily diffused, and therefore the uniformity of light in the light emission surface can be improved. Here, among the surfaces constituting the concave dot structure, all the concave dot structures with respect to the progress direction of light have a curved shape or have a shape so that there is at least one region which is not perpendicular with respect to the progress direction of light. These shapes, sizes and depths may be unified into one type or a combination of a plurality of types.

In the concave dot structure shown in FIGS. 5(a) to 5(g), the light emission surface of the light guide plate is a concave dot structure, but may be a convex dot structure. However, from the viewpoint of sealing the dot structure described later, the concave dot structure is preferable.

Here, the size of the concave dot structure can be X, which is a length shown in FIGS. 5(a) to 5(g). X indicates the length of the concave dot structure facing the progress direction of light, and contributes to the performance to light of the concave dot structure. Also, the depth can be a distance from the plane A-A having the concave dot structure to the deepest position of the concave dot structure.

Here, in the case of the convex dot structure, the "depth" of the concave dot structure becomes the "height". In this case, the height can be a distance from the plane having the convex dot structure to the highest position of the convex dot structure.

Also, the size and depth of the concave dot structure can each change depending on the distance from the light source, with the upper limit being 50 μm. For example, the size and depth of the concave dot structure can continuously increase with distance from the light source. In this case, the amount of light emitted from the light emission surface is small at a position where light source is close and the light is strong, and the uniformity of the amount of light emitted can be enhanced since the amount of light emitted is increased as the distance from the light source member increases. In addition, the concave dot structure may be a concave dot structure with a large size only at a desired portion where stronger light is to be emitted, or may be a dot structure having only a partially different structure as only a part of the concave dot structure appears differently.

Figure 6:
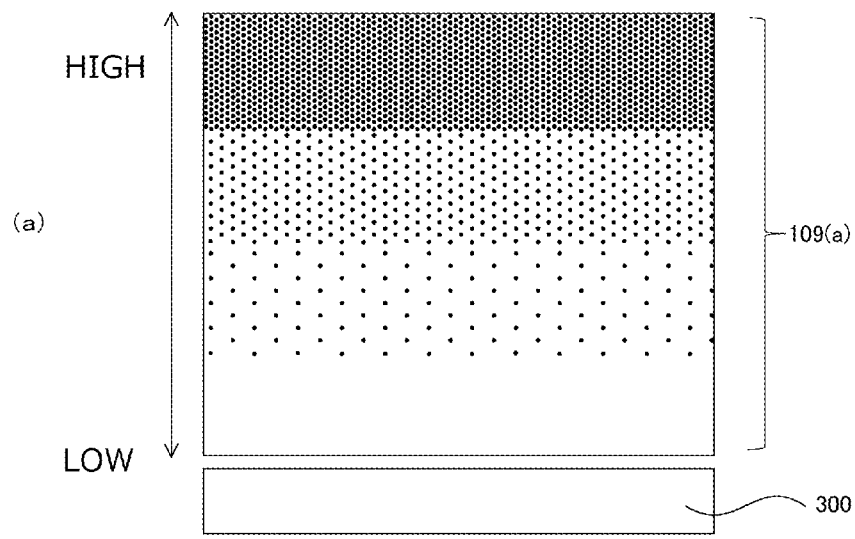
FIG. 6 is a schematic view showing an example of a distribution of the dot structures in the light guide plate.
Figure 6:
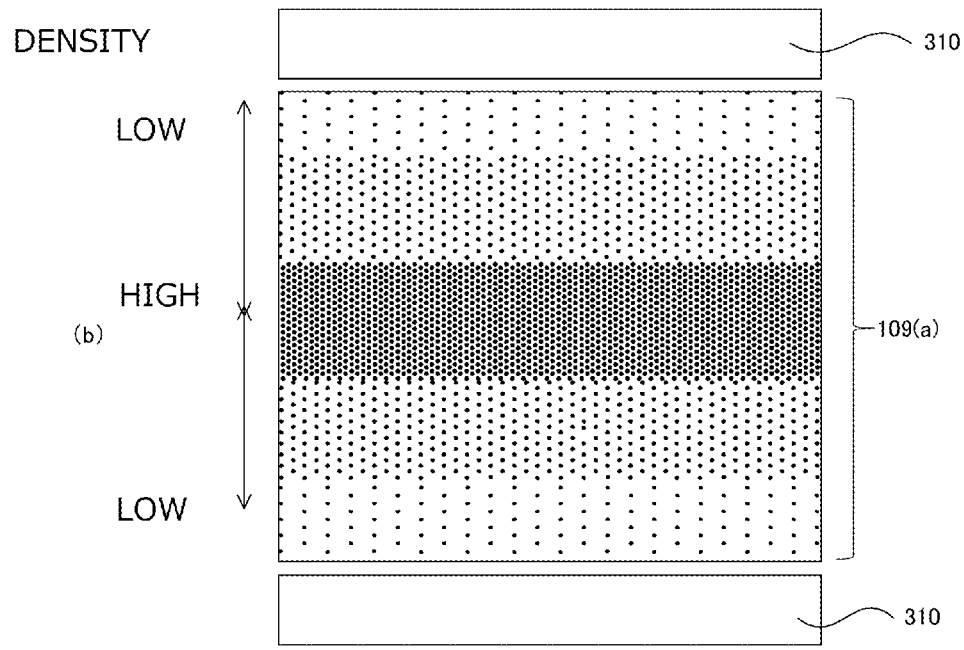

The dot structures can be arranged on the surface of the light guide plate randomly and in plural, or can be arranged so that a distribution density of the dot structure becomes higher as it is further away from a side close to the light source of the light guide plate (FIG. 6). For example, the distribution density may be about 50/mm$^2$ in a region closest to the light source, and about 300/mm$^2$ in a region farthest from the light source. By doing so, it is possible to improve the emission uniformity of light in the light emission surface.

In addition, when the light source is installed also on the other side of the light guide plate, the emission uniformity of the light in the light emission surface can be improved, so the arrangement and the distribution density of the dot structure described above can be appropriately adjusted.

The concave dot structure can be sealed with a sealing member such as a sealing film or an adhesive. By doing so, it is possible to prevent dust, scratches and the like from invading and adhering into the concave dot structure, and prevent the decrease in the emission intensity of the light guide plate.

In addition, when another layer is laminated on the surface of the light guide plate having the concave dot structure, in the case where the sealing is not performed, a thin air layer can enter between the opposite surface of the light guide plate other than the processed portion and the another layer, and the interference unevenness may be caused. By performing the sealing, it is possible to prevent the interference unevenness.

In addition, when the dot structure is sealed, the inside of the processed portion of the dot structure may be filled with any of gas, liquid, and solid or may be in a vacuum state.

2-2-1-2. Characteristic

Figure 7:
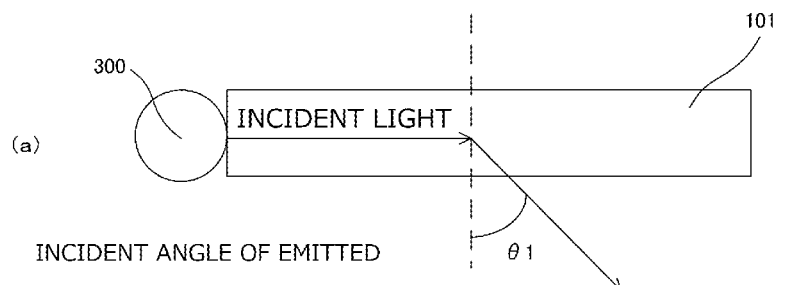
FIG. 7 is an explanatory diagram showing an optical behavior of each part of the light guiding laminate.
Figure 7:
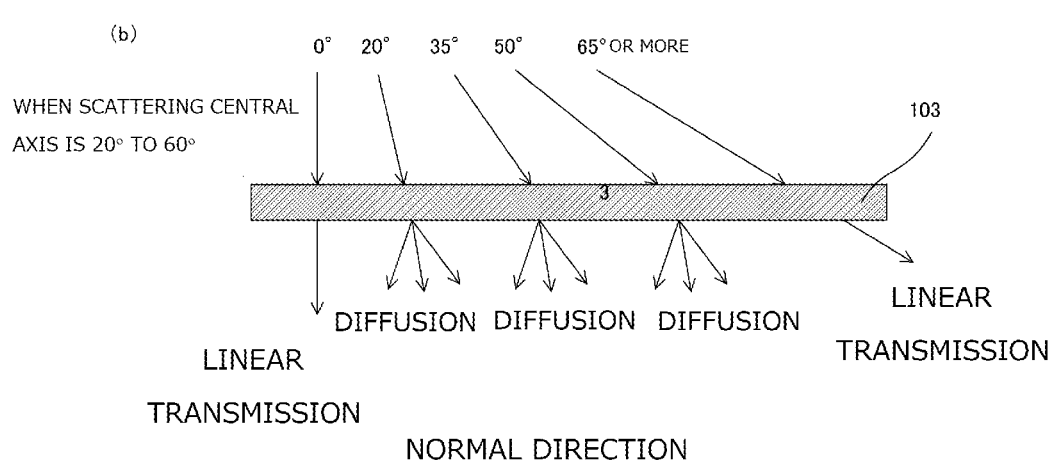
Figure 7:
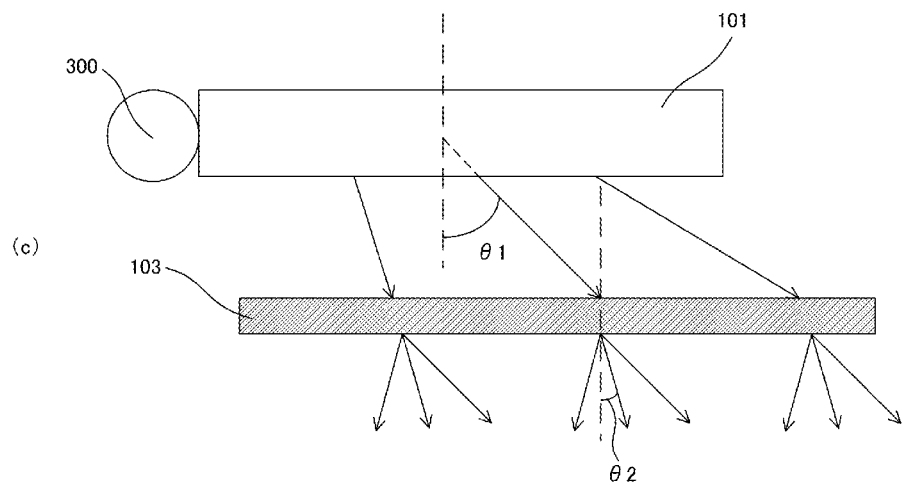

The angle (FIG. 7 (a)) at which the emission intensity of the light emitted from the light guide plate in the light emission surface of the light guide plate in the present invention is maximum is 20° to 60° with respect to the direction perpendicular to the light emission surface. As shown in FIG. 7(b), when the scattering central axis of the anisotropic optical film is set to be 20° to 60°, in the case where the angle at which the emission intensity of the light guide plate is maximum is less than 20°, since light linearly transmits through the anisotropic optical film, the light guide plate has sufficient illuminance and does not need to be combined with the anisotropic optical film. On the other hand, when the angle at which the emission intensity of the light guide plate is maximum exceeds 60°, the effect of improving illuminance cannot be expected even when the light guide plate is combined with the anisotropic optical film.

2-2-1-3. Manufacturing Method

The processed portion at which the reflection angle of light is changed is formed on any surface of the light guide plate. A method of manufacturing the processed portion is not specifically limited, and examples thereof include processing methods, such as ultrasonic processing, heating processing, laser processing, cutting, processing by nanoimprint and the like. For example, in the case of manufacturing a concave dot structure by the ultrasonic processing, an ultrasonically processed horn in which the convex dot structure having a shape in which the concave dot structure is inverted is arranged on a tip surface is vertically pressed against the material of the light guide plate, so the shape of the dot structure can be transferred to form the concave dot structure.

The dot structure can also be manufactured by screen printing, silk printing or the like.

In addition, the dot structure may be molded in a concave shape or convex shape simultaneously at the time of molding the light guide plate using a metal mold and the like which are manufactured to be able to mold the dot structure.

2-2-2. Anisotropic Optical Film

The anisotropic optical film according to the present invention is laminated on the light emission surface of the light guide plate directly or through another layer, and functions to diffuse the light emitted from the light guide plate at a specific angle of incident light. That is, the anisotropic optical film is characterized in that the diffusibility of light is changed according to the angle of incident light.

2-2-2-1. Structure

The anisotropic optical film according to the present invention will be described with reference to FIGS. 8 to 11.

Figure 8:
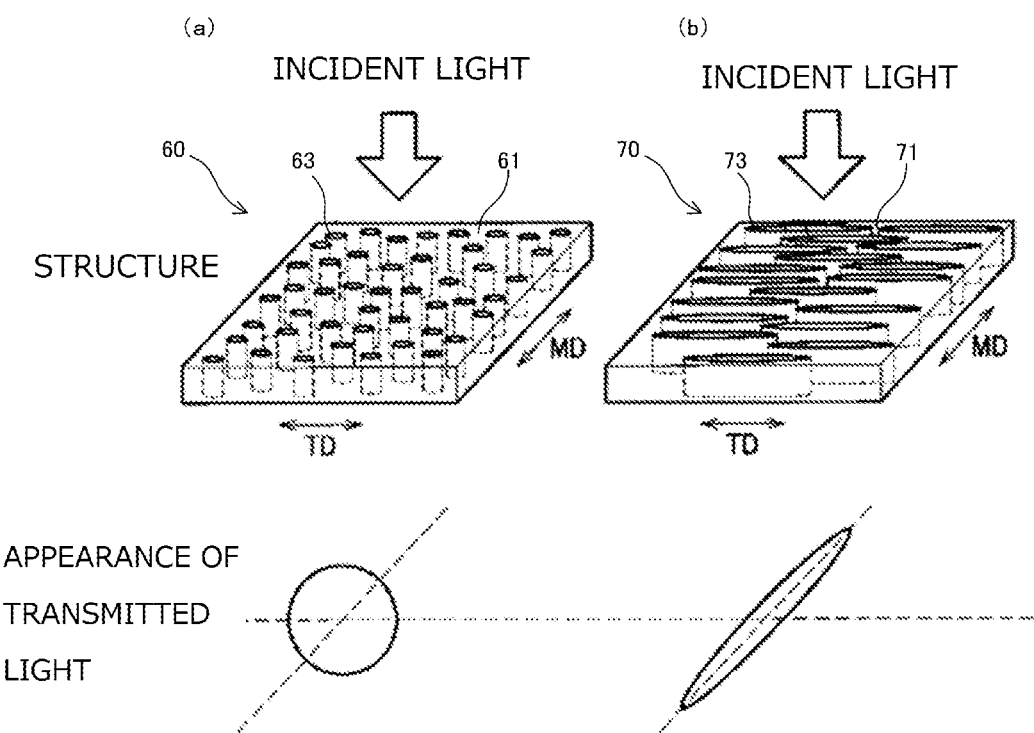
FIG. 8 is a schematic view showing an example of a structure of an anisotropic optical film having a plurality of structures each having a columnar structure and a tabular structure, and a state of transmitted light incident on the anisotropic optical film.
Figure 9:
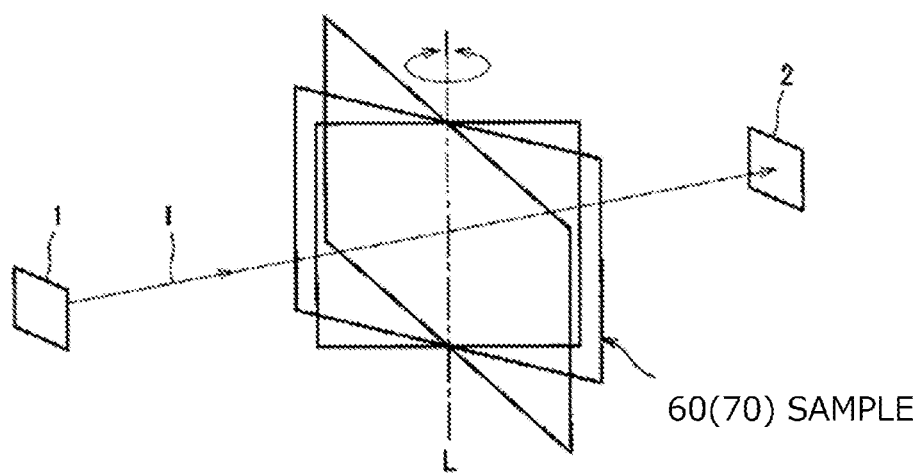
FIG. 9 is an explanatory diagram showing a method of evaluating light diffusibility of the anisotropic optical film.
Figure 10:
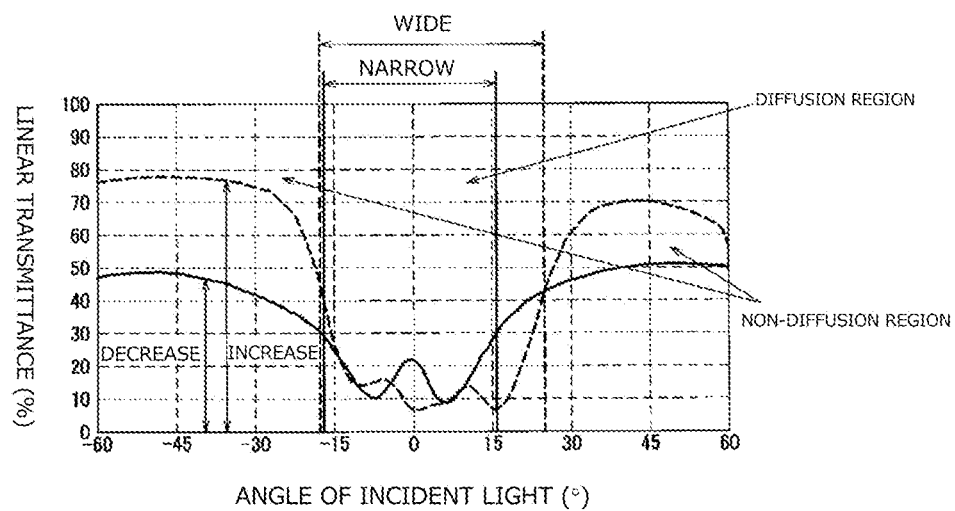
FIG. 10 is a graph showing the relationship between an angle of incident light on the anisotropic optical film having the columnar structure and the tabular structure shown in FIG. 8 and the linear transmittance.
Figure 11:
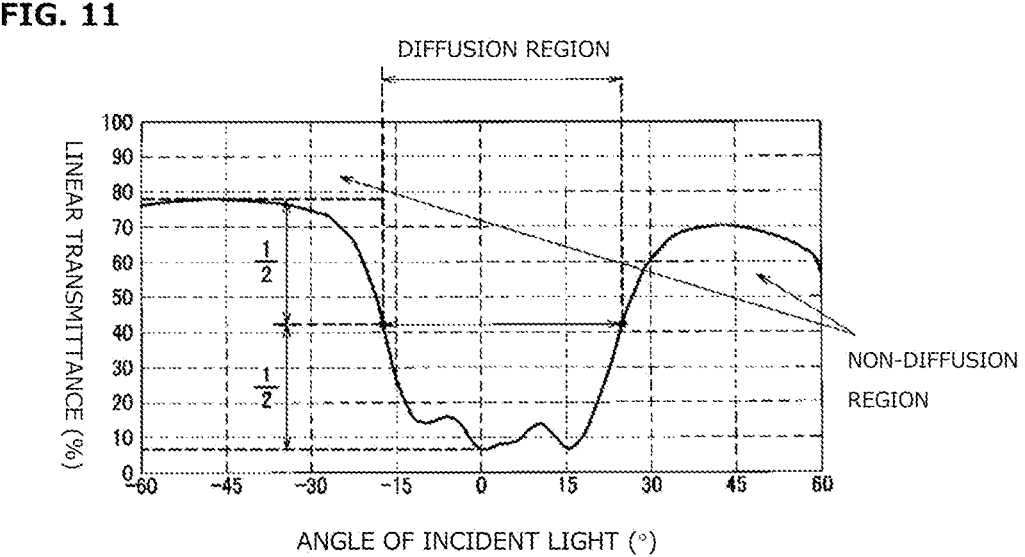
FIG. 11 is a graph for explaining a diffusion region and a non-diffusion region.

FIG. 8 is a schematic view showing an example of a structure of an anisotropic optical film having a structural region formed of a plurality of structures each having a pillar (substantially pillar) structure and a louver (substantially plate-like) structure, and a state of transmitted light incident on the anisotropic optical film. FIG. 9 is an explanatory diagram showing a method of evaluating light diffusibility of the anisotropic optical film. FIG. 10 is a graph showing the relationship between an angle of incident light on the anisotropic optical film of the columnar structure and the tabular structure shown in FIG. 8 and the linear transmittance. FIG. 11 is a graph for explaining a diffusion region and a non-diffusion region.

The anisotropic optical film is a film in which a structural region including a plurality of structures having different refractive indices from that of a matrix region of a film is formed in a thickness direction of the film.

The structural region may be formed over the entire region from one surface to the other surface of the anisotropic optical film, and may be partially or intermittently formed.

The shape of the structure is not particularly limited, but for example, as shown in FIG. 8(a), an anisotropic optical film (anisotropic optical film 60 having a columnar structure) in which a columnar structure 63 having a refractive index different from that of a substantially pillar (for example, bar-like) matrix region having a small aspect ratio of a short diameter and a long diameter is formed is present in a matrix region 61 or as shown in FIG. 8(b), an anisotropic optical film (anisotropic optical film 70 having a tabular structure) in which a tabular structure 73 having a refractive index different from that of a substantially plate-like matrix region having a large aspect ratio is formed is present in a matrix region 71. Further, these structural regions may be configured in only a single shape or configured in a combination of a plurality of shapes. For example, the columnar structure and the tabular structure may be mixed. By doing so, optical characteristics of the optical film, particularly, the linear transmittance or the diffusibility can be adjusted widely.

Also, an orient direction of these structural regions may have an inclination with respect to the normal direction of the film. By doing so, the anisotropic optical film may have properties that in an angle range (diffusion region) of incident light close to the direction inclined by a predetermined angle from the normal direction, the incident light may be strongly diffused, but in an angle range of incident light (non-diffuse region) beyond the angle range of incident light, the diffusion is weak and the linear transmittance is increased.

Furthermore, the angle at which the emission intensity of the light guide plate is maximal is an angle close to the normal direction of the light emission surface in a region close to the light source, and the inclination with respect to the normal direction tends to increase with being further away from the light source. Therefore, it is preferable to change the angle of the scattering central axis of the anisotropic optical film with the change in the angle at which the emission intensity of the light guide plate is maximal. By doing so, the uniformity of the emission intensity of light in the light emission surface of the light guiding laminate can be improved.

2-2-2-2. Characteristic

The anisotropic optical film having the above-described structure is a light diffusion film having different light diffusion properties depending on the angle of incident light on the film, that is, a light diffusion film having the angle of incident light dependency. When the light incident on the anisotropic optical film at a predetermined incident angle is substantially parallel with the orient direction (for example, an extending direction (orient direction) of the columnar structure 63 in the columnar structure or a height direction of the tabular structure 73 in the tabular structure) of the region having a different refractive index, the diffusion is preferentially made, and when the light incident on the anisotropic optical film is not parallel with the orient direction, the transmission is preferentially made.

Here, the light diffusibility of the anisotropic optical film will be described in more detail with reference to FIGS. 9 and 10. Here, the light diffusibility of the anisotropic optical film 60 having the columnar structure and the light diffusibility of the anisotropic optical film 70 having the tabular structure which are described above will be described as an example.

The method of evaluating light diffusibility is performed as follows. First, as shown in FIG. 9, the anisotropic optical films 60 and 70 are disposed between the light source 1 and the detector 2. In the present embodiment, the angle of incident light is 0° when irradiation light I from the light source 1 is incident from the normal direction of the anisotropic optical films 60 and 70. In addition, the anisotropic optical films 60 and 70 are disposed so as to be arbitrarily rotatable about a straight line L, and the light source 1 and the detector 2 are fixed. That is, according to this method, the linear transmittance can be obtained by disposing a sample (anisotropic optical films 60 and 70) between the light source 1 and the detector 2 and measuring the amount of linearly transmitted light which linearly transmits the sample and enters the detector 2 while the angle is changed with a straight line L on a surface of the sample as the center.

The light diffusibilities of the anisotropic optical films 60 and 70 are evaluated when a TD direction (width direction of the anisotropic optical film) of FIG. 8 is selected as the straight line L of a center of rotation shown in FIG. 9, and the evaluation results of the obtained light diffusibilities are shown in FIG. 10. FIG. 10 shows the angle of incident light dependency of the light diffusibilities (light scattering properties) of the anisotropic optical films 60 and 70 shown in FIG. 8 measured using the method shown in FIG. 9. A vertical axis in FIG. 10 represents the linear transmittance (in the present embodiment, when parallel rays of a predetermined amount of light are incident, a ratio of the amount of light of parallel rays emitted in the same direction as the incident direction, more specifically, linear transmittance= (amount of linearly transmitted light which is the amount of light detected by the detector 2 when there are the anisotropic optical films 60 and 70/amount of incident light which is the amount of light detected by the detector 2 when there are no anisotropic optical films 60 and 70)×100), and a horizontal axis represents the angle of incident light on the anisotropic optical films 60 and 70. A solid line in FIG. 10 represents the light diffusibility of the anisotropic optical film 60 having the columnar structure, and a broken line in FIG. 10 represents the light diffusibility of the anisotropic optical film 70 having the tabular structure. In addition, the positive and negative of the angle of incident light show that rotation directions of the anisotropic optical films 60 and 70 are reverse to each other.

As shown in FIG. 10, the light diffusibilities of the anisotropic optical films 60 and 70 have the angle of incident light dependency in which the linear transmittance is changed depending on the angle of incident light. Here, as shown in FIG. 10, a curve showing the angle of incident light dependency of the light diffusibility is referred to as an "optical profile". The optical profile does not directly represent the light diffusibility, but if it is interpreted that the linear transmittance decreases and to the contrary, the diffusive transmittance increases, it can be said that the optical profile generally shows light diffusibility. In a normal isotropic light diffusion film, a mountain-shaped optical profile having a peak around 0° is shown, but in the anisotropic optical films 60 and 70, compared with the linear transmittance when light is incident in the central axis direction of the columnar structure 63 and the tabular structure 73, that is, the scattering central axis direction (the angle of incident light in this direction is 0°), a valley-shaped optical profile in which the linear transmittance is once a minimum value at the angle of incident light of +5° to +20° or −5° to −20°, the linear transmittance increases as (absolute value of) the angle of incident light increases, and the linear transmittance is a maximum value at the angle of incident light of +40° to +60° or −40° to −60° is shown. By doing so, the anisotropic optical films 60 and 70 have properties that the incident light is strongly diffused in the angle range of incident light of ±20° close to the scattering central axis direction, but the diffusion is weakened and the linear transmittance is increased in the angle range of incident light beyond the angle range of incident light. Hereinafter, the angle range of two incident lights with respect to linear transmittance of an intermediate value between the maximum linear transmittance and the minimum linear transmittance is referred to as a diffusion region (the width of this diffusion region is referred to as "diffusion width"), and an angle range of incident light other than the angle range of two incident lights is referred to as a non-diffusion region (transmission region). Here, the diffusion region and the non-diffusion region will be described by considering the anisotropic optical film 70 having the tabular structure as an example with reference to FIG. 11. FIG. 11 shows the optical profile of the anisotropic optical film 70 having the tabular structure of FIG. 10, but as shown in FIG. 11, the angle range of incident light between the angles of two incident lights (inside the angles of two incident lights at positions of two black points on the optical profile shown in FIG. 11) with respect to the linear transmittance (in the example of FIG. 11, the linear transmittance is about 42%) of the intermediate value between the maximum linear transmittance (in the example of FIG. 11, the linear transmittance is about 78%) and the minimum linear transmittance (in the example of FIG. 11, the linear transmittance is about 6%) becomes the diffusion region, and an angle range of incident light other than the angle range of incident light (outside the angles of two incident lights at positions of two black points on the optical profile shown in FIG. 11) becomes the non-diffusion region.

In the present invention, since the anisotropic optical film is used in combination with the light guide plate, the angle range (range between the angular values of each incident light in which two linear transmittances on the optical profile are 30% or less) of incident light in which the linear transmittance is 30% or less is handled as the "diffusion range" which is the range in which the diffusibility is high.

In the anisotropic optical film 60 having the columnar structure, as can be seen from the appearance of the transmitted light in FIG. 8(*a*), the transmitted light has a substantially circular shape, and the light diffusibilities in the MD direction and the TD direction are substantially the same. That is, in the anisotropic optical film 60 having the columnar structure, the diffusion has isotropy. Also, as shown by the solid line in FIG. 10, even if the angle of the incident light is changed, the change in light diffusibility (in particular, the optical profile in the vicinity of the boundary between the non-diffuse region and the diffusion region) is relatively soft, so there is an effect of preventing brightness from sharply changing or glare from occurring. However, in the anisotropic optical film 60, as can be understood by comparison with the optical profile of the anisotropic optical film 70 having the tabular structure shown by the broken line in FIG. 10, the linear transmittance decreases in the non-diffusion region, so there is also a problem in that the display characteristics (brightness, contrast, or the like) slightly decrease. In addition, the anisotropic optical film 60 having the columnar structure also has a problem in that the width of the diffusion region is narrower than that of the anisotropic optical film 70 having the tabular structure.

On the other hand, in the anisotropic optical film 70 having the tabular structure, as can be seen from the appearance of the transmitted light in FIG. 8(*b*), the transmitted light has a substantially needle shape, and the light diffusibilities in the MD direction and the TD direction are largely different. That is, in the anisotropic optical film 70 having the tabular structure, the diffusion has anisotropy. Specifically, in the example shown in FIG. 8, in the MD direction, the diffusion is wider than in the case of the columnar structure, but in the TD direction, the diffusion is narrower than in the case of the columnar structure. Also, as shown by the broken line in FIG. 10, there is a concern that if the angle of incident light is changed, since the change (in particular, the optical profile near the boundary between the non-diffusion region and the diffusion region) in light diffusibility (in the case of the present embodiment, in the TD direction) is very steep, the brightness is sharply changed or glare appears when the anisotropic optical film 70 is applied to the display device, which is likely to reduce the visibility. In addition, the anisotropic optical film having the tabular structure has a problem in that light interference (rainbow) tends to occur. However, the anisotropic optical film 70 has an effect that the linear transmittance in the non-diffusion region is high, and the display characteristics can be improved.

As described above, the optical characteristics of the anisotropic optical film are changed depending on the aspect ratio of the plurality of structures in the anisotropic optical film. That is, the optical characteristics of the anisotropic optical film can be adjusted by adjusting the aspect ratio. The aspect ratio is not particularly limited, but there is a concern that the diffusion range may be narrowed as the aspect ratio decreases, and therefore, the aspect ratio is preferably 2 or more and less than 50, more preferably 2 or more and 10 or less, and still more preferably 2 or more or 5 or less. By setting the aspect ratio to be in such a range, the light diffusibility and the light condensing property are excellent.

In the anisotropic optical film of the present invention, the linear transmittance in the normal direction (0°) is preferably 40% or more, more preferably 50% or more, and still more preferably 60% or more. That is, since the diffusibility is weak for light incident from the normal direction, it is possible to prevent the display from being blurred.

Further, the anisotropic optical film of the present invention preferably has a linear transmittance of 30% or less with respect to incident light at an angle (20° to 60°) at which the emission intensity in the light emission surface of the light guide plate is maximum. That is, since the diffusibility is strong, the illuminance of light in the normal direction can increase.

Furthermore, the scattering central axis angle with respect to the normal direction of the anisotropic optical film is inclined to the normal direction side with respect to the angle (FIG. 7(*c*), θ1) at which the emission intensity of the light guide plate is maximum, and the difference between the scattering central axis angle (FIG. 7(*c*), θ2) and the angle at which the emission intensity of the light guide plate is maximum is preferably within 30°, more preferably within 20°, and still more preferably within 10°. By doing so, the light emitted from the light guide plate is strongly diffused, but in the incident angle range over that of light emitted from the light guide plate, the diffusion is weak and the linear transmittance increases.

3. Method of Manufacturing Light Guiding Laminate

3-1. Method of Manufacturing Anisotropic Optical Film

The anisotropic optical film according to the present embodiment can be manufactured by irradiating light rays, such as UV, to a photocurable composition layer. Hereinafter, raw materials of the anisotropic optical film are first described, and then a process of manufacturing an anisotropic optical film is described.

3-1-1. Raw Material of Anisotropic Optical Film

The raw materials of the anisotropic optical film are described in order of (1) photopolymerizable compound, (2) photoinitiator, (3) blending quantity, and other optional components.

3-1-1-1. Photopolymerizable Compound

The photopolymerizable compound which is a material for forming the anisotropic optical film according to the present embodiment is composed of a photopolymerizable compound selected from macromonomers, polymers, oligomers, and monomers having a radically polymerizable or cationically polymerizable functional group and a photoinitiator, and is a material which is polymerized and cured by being irradiated with ultraviolet light rays and/or visible light rays. Here, even if the material forming the anisotropic optical film contained in the anisotropic optical film is one type, the difference in refractive index occurs due to the difference in density. Since the curing rate is high in a portion where the UV irradiation intensity is high, the polymerized/cured material moves around the cured region, resulting in the formation of a region where the refractive index is high and a region where the refractive index is low. In addition, (meth) acrylate may be either acrylate or methacrylate.

The radically polymerizable compound mainly contains one or more unsaturated double bonds in a molecule, and specifically, examples thereof include acrylic oligomers called by the names of epoxy acrylate, urethane acrylate, polyester acrylate, polyether acrylate, polybutadiene acrylate, silicone acrylate and the like, and acrylate monomers such as 2-ethylhexyl acrylate, isoamyl acrylate, butoxyethyl acrylate, ethoxydiethylene glycol acrylate, phenoxyethyl acrylate, tetrahydrofurfuryl acrylate, isonorbornyl acrylate, 2-hydroxyethyl acrylate, 2-hydroxypropyl acrylate, 2-acryloyloxy phthalic acid, dicyclopentenyl acrylate, triethylene glycol diacrylate, neopentyl glycol diacrylate, 1,6-hexanediol diacrylate, EO adduct of bisphenol A diacrylate, trimethylolpropane triacrylate, EO modified trimethylolpropane triacrylate, pentaerythritol triacrylate, pentaerythritol tetraacrylate, ditrimethylolpropane tetraacrylate, and dipentaerythritol hexaacrylate. Also, these compounds may be used alone or in combination of two or more. Although methacrylates can also be used in the same manner, acrylates are generally preferred over methacrylates because of having a high photopolymerization rate.

As the cationically polymerizable compound, compounds having one or more of an epoxy group, a vinyl ether group and an oxetane group in the molecule can be used. Examples of the compound having the epoxy group include diglycidyl ethers of bisphenols such as 2-ethylhexyl diglycol glycidyl ether, glycidyl ether of biphenyl, bisphenol A, hydrogenated bisphenol A, bisphenol F, bisphenol AD, bisphenol S, tetramethyl bisphenol A, tetramethyl bisphenol F, tetrachlorobisphenol A, and tetrabromobisphenol A, polyglycidyl ethers of novolak resins such as phenol novolak, cresol novolak, brominated phenol novolak, and ortho cresol novolak, diglycidyl ethers of alkylene glycols such as ethylene glycol, polyethylene glycol, polypropylene glycol, butanediol, 1,6-hexanediol, neopentyl glycol, trimethylolpropane, 1,4-cyclohexanedimethanol, EO adduct of bisphenol A, and PO adduct of bisphenol A, glycidyl esters such as glycidyl ester of hexahydrophthalic acid or diglycidyl ester of dimer acid, and the like.

Examples of the compound having the epoxy group further include alicyclic epoxy compounds such as 3,4-epoxycyclohexylmethyl-3', 4'-epoxycyclohexanecarboxylate, 2-(3,4-epoxycyclohexyl-5,5-spiro-3,4-epoxy) cyclohexane-meta-dioxane, di (3,4-epoxycyclohexylmethyl) adipate, di (3,4-epoxy-6-methylcyclohexylmethyl) adipate, 3,4-epoxy-6-methylcyclohexyl-3', 4'-epoxy-6'-methylcyclohexanecarboxylate, methylenebis (3,4-epoxycyclohexane), dicyclopentadiene diepoxide, di (3,4-epoxycyclohexylmethyl) ether of ethylene glycol, ethylenebis (3,4-epoxycyclohexanecarboxylate), lactone modified 3,4-epoxycyclohexylmethyl-3', 4'-epoxycyclohexanecarboxylate, tetra (3,4-epoxycyclohexylmethyl) butane tetra carboxylate, di (3,4-epoxycyclohexylmethyl)-4, and 5-epoxytetrahydrophthalate, but are not limited thereto.

Examples of the compound containing the vinyl ether group include diethylene glycol divinyl ether, triethylene glycol divinyl ether, butanediol divinyl ether, hexanediol divinyl ether, cyclohexane dimethanol divinyl ether, hydroxybutyl vinyl ether, ethyl vinyl ether, dodecyl vinyl ether, trimethylolpropane trivinyl ether, propenyl ether propylene carbonate and the like, but are not limited thereto. The vinyl ether compound is generally cationically polymerizable, but can be radically polymerizable by being combined with an acrylate.

Further, as compound having the oxetane group, 1,4-bis [(3-ethyl-3-oxetanylmethoxy) methyl] benzene, 3-ethyl-3-(hydroxymethyl)-oxetane and the like can be used.

Also, the above cation polymerization compounds may be used alone or in combination of two or more. The photopolymerizable compound is not limited to the above. Further, in order to generate a sufficient difference in refractive index, a fluorine atom (F) may be introduced into the photopolymerizable compound to decrease the refractive index, and a sulfur atom (S), a bromine atom (Br), and various metal atoms may be introduced to increase the refractive index. Furthermore, as disclosed in JP 2005-514487 A, it is also effective to add functional ultrafine particles into which photopolymerizable functional groups such as an acryl group, a methacryl group, or an epoxy group are introduced to the above-described photopolymerizable compounds, on a surface of ultrafine particles formed of a metal oxide of high refractive index such as titanium oxide ($TiO_2$), zirconium oxide ($ZrO_2$), and tin oxide ($SnO_x$).

3-1-1-1-1. Photopolymerizable Compound Having Silicone Skeleton

In the present embodiment, it is preferable to use a photopolymerizable compound having a silicone skeleton as the photopolymerizable compound. The photopolymerizable compound having the silicone skeleton is oriented, polymerized, and cured with its structure (mainly ether bond), and forms a low refractive index region, a high refractive index region, or both the low refractive index region and the high refractive index region. By using the photopolymerizable compound having the silicone skeleton, the structures 63 and 73 is easily inclined, so the light condensing property in the front direction is improved. The low refractive index region corresponds to one of the structures 63 and 73 or the matrix regions 61 and 71, and the other thereof corresponds to the high refractive index region.

In the low refractive index region, it is preferable that the amount of silicone resin, which is a cured product of the photopolymerizable compound having the silicone skeleton, is relatively large. As a result, the scattering central axis can be further easily inclined, so the light condensing property in the front direction is improved. Since a silicone resin contains a large amount of silicon (Si) as compared to a compound having no silicone skeleton, the relative amount of silicone resin can be confirmed by using energy dispersive X-ray spectrometer (EDS) with the silicon as an index.

The photopolymerizable compound having the silicone skeleton is monomers, oligomers, prepolymers, or macromonomers having the radically polymerizable or cationically polymerizable functional group. Examples of the radically polymerizable functional group include an acryloyl group, a methacryloyl group, an allyl group and the like, and examples of the cationically polymerizable functional group include an epoxy group, an oxetane group and the like. The type and the number of functional groups are not particularly limited, but since it is preferable that the more the number of functional groups, the higher the crosslink density and the more easily the difference in refractive index is generated, it is preferable to have a multifunctional acryloyl group or methacryloyl group. Also, the compound having the silicone skeleton may be insufficient in compatibility with other compounds due to its structure, but in such a case, can be urethanized to enhance the compatibility. In the present embodiment, silicone urethane (meth) acrylate having an acryloyl group or a methacryloyl group at an end thereof is preferably used.

A weight average molecular weight (Mw) of the photopolymerizable compound having the silicone skeleton is preferably in the range of 500 to 50,000. More preferably, the weight average molecular weight (Mw) of the photopolymerizable compound having the silicone skeleton is in the range of 2,000 to 20,000. When the weight average molecular weight is in the above range, a sufficient photocuring reaction occurs, and the silicone resin present in each of the anisotropic optical films of the anisotropic optical films 60 and 70 is easily oriented. With the orientation of the silicone resin, the scattering central axis is easily inclined.

As the silicone skeleton, for example, one represented by the following general formula (1) can be used. In the general formula (1), $R_1$, $R_2$, $R_3$, $R_4$, $R_5$, and $R_6$ each independently have functional groups such as a methyl group, an alkyl group, a fluoroalkyl group, a phenyl group, an epoxy group, an amino group, a carboxyl group, a polyether group, an acryloyl group, and a methacryloyl group. In the general formula (1), n is preferably an integer of 1 to 500.

Chemical Formula 1

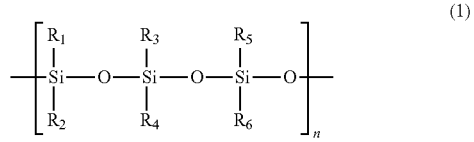

(1)

3-1-1-1-2. Compound Having No Silicone Skeleton

If the compound having no silicone skeleton is blended with the photopolymerizable compound having the silicone skeleton to form the anisotropic optical film, it is preferable that the low refractive index region and the high refractive index region are likely to be separated and formed and the anisotropic degree is strong. As the compound having no silicone skeleton, a thermoplastic resin and a thermosetting resin other than a photopolymerizable compound can be used, and a combination of the thermoplastic resin and the thermosetting resin with the photopolymerizable compound can also be used. As the photopolymerizable compound, polymers, oligomers, and monomers having the radically polymerizable or cationically polymerizable functional group can be used (however, those having no silicone skeleton). Examples of the thermoplastic resin include polyester, polyether, polyurethane, polyamide, polystyrene, polycarbonate, polyacetal, polyvinyl acetate, acrylic resin, and copolymers or modified products thereof. In the case of using the thermoplastic resin, the thermoplastic resin is dissolved using a solvent and the photopolymerizable compound having the silicone skeleton is cured with ultraviolet light after application and drying, thereby forming the anisotropic optical film. Examples of the thermosetting resin include an epoxy resin, a phenol resin, a melamine resin, a urea resin, unsaturated polyester, and copolymers or modified products thereof. In the case of using the thermosetting resin, the photopolymerizable compound having the silicone skeleton is cured with ultraviolet light and then is appropriately heated to cure the thermosetting resin, thereby forming the anisotropic optical film. As the compound having no silicone skeleton, the photopolymerizable compound is most preferable, and since the low refractive index region and the high refractive index region are easily separated, the drying process in which the solvent is not necessary in the case of using the thermoplastic resin is not necessary, the thermosetting process like the thermosetting resin is not necessary and the like, productivity is excellent.

3-1-1-2. Photoinitiator

Examples of the photoinitiator capable of polymerizing the radically polymerizable compound include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1-one, 2-hydroxy-2-methyl-1-phenylpropan-1-one, 1-hydroxycyclohexyl phenyl ketone, 2-methyl-1-[4-(methylthio) phenyl]-2-morpholinopropanone-1, 1-[4-(2-hydroxyethoxy)-phenyl]-2-hydroxy-2-methyl-1-propane-1-one, bis (cyclopentadienyl)-bis (2,6-difluoro-3-(pyr-1-yl) titanium, 2-benzyl-2-dimethylamino-1-(4-morpholinophenyl)-butanone-1,2,4,6-trimethylbenzoyl diphenyl phosphine oxide and the like. Also, these compounds may be used alone or in combination of two or more.

In addition, the photoinitiator of the cationically polymerizable compound is a compound capable of generating an acid upon irradiation with light and polymerizing the above-described cationically polymerizable compound by the generated acid, and generally, onium salts and a metallocene complexes are used. As the onium salts, diazonium salts, sulfonium salts, iodonium salts, phosphonium salts, selenium salts and the like are used, and as counter ions thereof, anions such as $BF_4^-$, $PF_6^-$, $AsF_6^-$, and $SbF_6^-$ are used. Specific examples thereof include 4-chlorobenzenediazonium hexafluorophosphate, triphenylsulfonium hexafluoroantimonate, triphenylsulfonium hexafluorophosphate, (4-phenylthiophenyl) diphenylsulfonium hexafluoroantimonate, (4-phenylthiophenyl) diphenyl sulfonium hexafluorophosphate, bis [4-(diphenylsulfonio) phenyl] sulfide-bis-hexafluoroantimonate, bis [4-(diphenylsulfonio) phenyl] sulfide-bis-hexafluorophosphate, (4-methoxyphenyl) diphenylsulfonium hexafluoroantimonate, (4-methoxyphenyl) phenyliodonium hexafluoroantimonate, bis (4-t-butylphenyl) iodonium hexafluorophosphate, benzyltriphenylphosphonium hexafluoroantimonate, triphenylselenium hexafluorophosphate, (η5-isopropylbenzene) (η5-cyclopentadienyl) iron (II) hexafluorophosphate and the like, but are not limited thereto. Also, these compounds may be used alone or in combination of two or more.

3-1-1-3. Blending Amount, Other Optional Components

In the present embodiment, the photoinitiator is blended in about 0.01 to 10 parts by weight, preferably about 0.1 to 7 parts by weight, and more preferably about 0.1 to 5 parts by weight with respect to 100 parts by weight of the photopolymerizable compound. The reason is that if the photoinitiator is less than 0.01 parts by weight, the photocuring property is reduced, and if the photoinitiator exceeds 10 parts by weight, only the surface is cured and the curing property of the inside thereof is reduced, which causes harmful effects, coloring, and hindrance of the formation of columnar structures. These photoinitiators are usually used by directly dissolving powder in the photopolymerizable compound, but if the solubility is poor, the photoinitiator which is previously dissolved in a trace of solvent in high concentration can be used. As the solvent, photopolymerizable solvents are more preferable, and specific examples thereof include propylene carbonate, γ-butyrolactone and the like. It is also possible to add various known dyes and sensitizers in order to improve the photopolymerizability. Furthermore, the thermosetting initiator capable of curing the photopolymerizable compound by heating may be used in combination with the photoinitiator. In this case, it can be expected to further accelerate and complete the polymerization and curing of the photopolymerizable compound by the heating after the photocuring.

In the present embodiment, the anisotropic optical film can be formed by curing a composition in which the photopolymerizable compounds are used alone or in combination. In addition, the anisotropic optical film of the present embodiment can also be formed by curing a mixture of the photopolymerizable compound and a polymer resin having no photocurability. Examples of the polymer resin that can be used here include an acrylic resin, a styrene resin, a styrene-acrylic copolymer, a polyurethane resin, a polyester resin, an epoxy resin, a cellulose resin, a vinyl acetate resin, a vinyl chloride-vinyl acetate copolymer, a polyvinyl butyral resin and the like. Although these polymer resins and the photopolymerizable compounds need to have sufficient compatibility before the photocuring, various organic solvents, plasticizers, and the like can be used to secure the compatibility. In addition, in the case of using an acrylate as the photopolymerizable compound, as a polymer resin, those selected from an acrylic resin are preferable from the viewpoint of compatibility.

The ratio of the photopolymerizable compound having the silicone skeleton and the compound having no silicone skeleton is preferably in the range of 15:85 to 85:15 by mass. More preferably, the ratio of the photopolymerizable compound having the silicone skeleton and the compound having no silicone skeleton is in the range of 30:70 to 70:30. By setting this range, a phase separation between the low refractive index region and the high refractive index region is easily progressed, and the pillar region is easily inclined. When the ratio of the photopolymerizable compound having the silicone skeleton is less than the lower limit value or exceeds the upper limit value, the phase separation is hardly progressed, and the plurality of structures is less likely to be inclined. When the silicone-urethane-(meth) acrylate is used as the photopolymerizable compound having the silicone skeleton, the compatibility with the compound having no silicone skeleton is improved. By doing so, the plurality of structures can be inclined even if the mixing ratio of the materials is extended.

3-1-1-3-1. Solvent

Examples of the solvent used at the time of preparing the composition containing the photopolymerizable compound include ethyl acetate, butyl acetate, acetone, methyl ethyl ketone, methyl isobutyl ketone, cyclohexanone, toluene, xylene and the like.

3-2. Method of Manufacturing Anisotropic Optical Film

Figure 12:
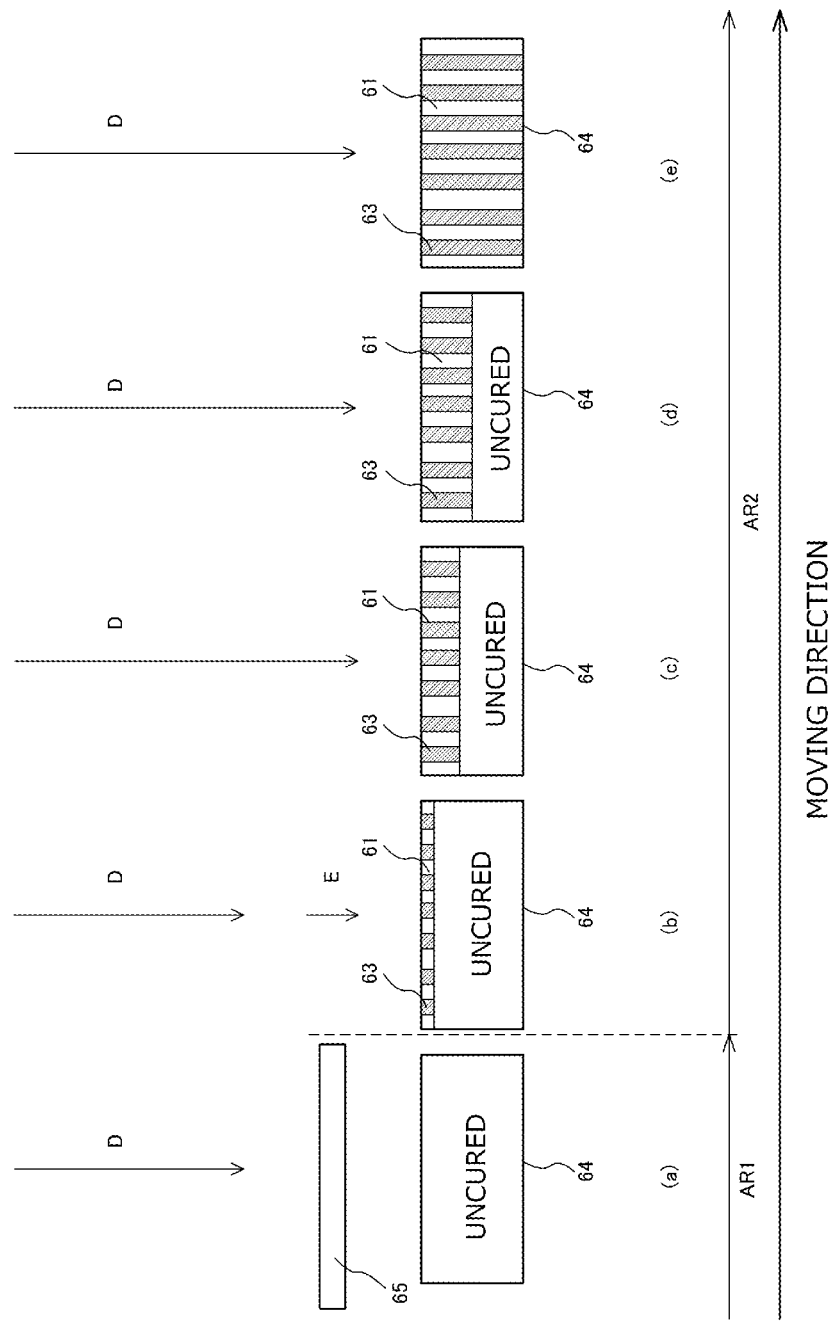
FIG. 12 is a schematic view showing an outline of a manufacturing process of an anisotropic optical film 60 and an outline of forming a columnar structure 63 grown according to the manufacturing process.
Figure 13:
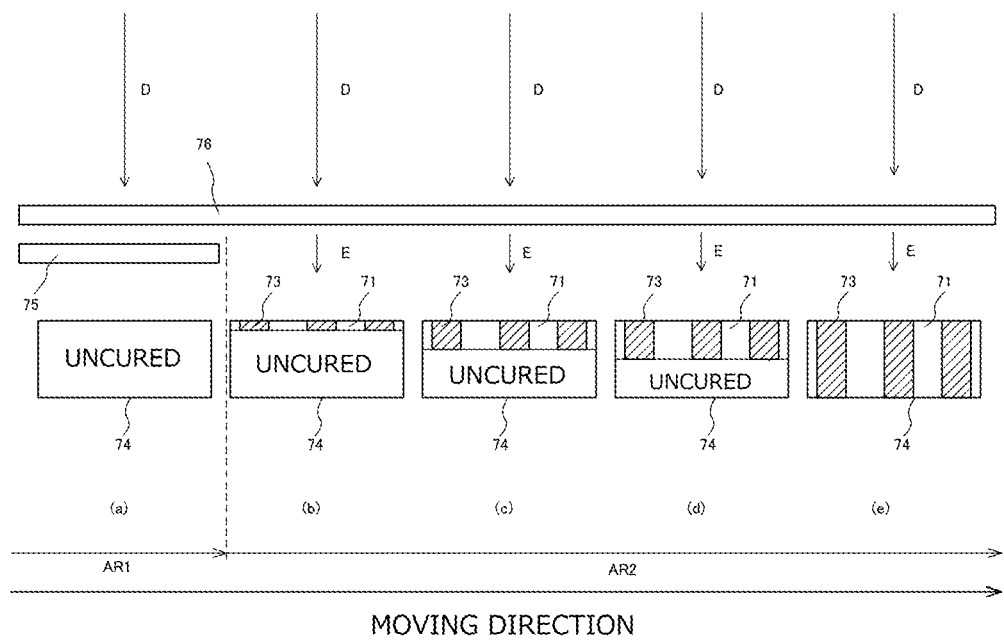
FIG. 13 is a schematic view showing an outline of a manufacturing process of an anisotropic optical film 70 and an outline of forming a tabular structure 73 grown according to the manufacturing process.

Next, the process (manufacturing method) of the anisotropic optical film 60 and the anisotropic optical film 70 of the present embodiment is described. FIG. 12 is a schematic view showing an outline of a process of manufacturing the anisotropic optical film 60 having the columnar structure and an outline of forming the columnar structure 63 grown according to the manufacturing process. In addition, FIG. 13 is a schematic view showing an outline of a process of manufacturing the anisotropic optical film 70 according to the present embodiment and an outline of forming the tabular structure 73 grown according to the manufacturing process.

The outline of the process of manufacturing the anisotropic optical film 60 and the anisotropic optical film 70 is as follows. First, a composition (hereinafter sometimes referred to as "photocurable composition") containing the above-described photopolymerizable compound is applied on a suitable base (substrate) such as a transparent PET film or is provided on the substrate in a sheet form and is grown to provide a photocurable composition layer. The photocurable composition layer is optionally dried to volatilize the solvent, and then the dried photocurable composition layer is irradiated with light, thereby manufacturing the anisotropic optical film having the anisotropic optical film 60 or the anisotropic optical film 70 as one layer. Hereinafter, one obtained by applying the photocurable composition which on a substrate or providing the photocurable composition on the substrate in a sheet form and drying the photocurable composition is called a coating film 64 for the anisotropic optical film 60 and a coating film 74 for anisotropic optical film 70.

3-2-1. Process of Forming Anisotropic Optical Film 60 and Anisotropic Optical Film 70

The following steps will be described in detail as the steps of forming the anisotropic optical film 60 and the anisotropic optical film 70 according to the present embodiment.

(Step 1) Coating step of coating a composition for forming an anisotropic optical film on a substrate and providing and drying a coating film (this step is a common step in the manufacturing of the anisotropic optical films 60 and 70)

(Step 2) Mask film laminating step of laminating a mask film on the coating film (this step is a common step in manufacturing of anisotropic optical films 60 and 70, which is optional)

(Step 3) Step of forming a structural region of an anisotropic optical film performing a cure by irradiation of a light rays on the coating film (this step is a different step in the manufacturing of the anisotropic optical films 60 and 70, which will be described later)

3-2-1-1. Step 1: Coating Step

In step 1, as a method of providing a composition containing a photopolymerizable compound on a substrate in a sheet form, a normal coating method or printing method is applied. Specifically, coating such as air doctor coating, bar coating, blade coating, knife coating, reverse coating, transfer roll coating, gravure roll coating, kiss coating, cast coating, spray coating, slot orifice coating, calendar coating, dam coating, dip coating, and die coating, intaglio printing such as gravure printing, printing such as stencil printing such as screen printing, and the like can be used. If the composition has a low viscosity, it is also possible to provide a dam of a constant height around the substrate to cast the composition into an inside surrounded by the dam.

3-2-1-2. Process 2: Step of Laminating Mask Film (Optional)

In step 2, in order to prevent oxygen hindrance of the photocurable composition layer and efficiently form the structural region (a plurality of structures) which is a feature of the anisotropic optical film according to the present embodiment, it is preferable to laminate the mask film (hereinafter, simply referred to as a mask and the like) in close contact with a light irradiation side of the coating film to locally change irradiation intensity of light. The material of the mask is not particularly limited, and for example, a normal transparent plastic film or the like may be used. However, since a light absorbing filler such as carbon is dispersed in a matrix, and a part of incident light is absorbed to carbon, but an opening portion may be configured to sufficiently transmit light. Such a matrix may be a transparent plastic such as PET, TAC, PVAc, PVA, acryl, and polyethylene, inorganic matters such as glass and quartz, or those containing patterning for controlling an amount of transmitted ultraviolet lights to a sheet including these matrixes or a pigment absorbing ultraviolet lights. When such a mask is not used, it is also possible to prevent the oxygen hindrance of the photocurable composition layer by performing light irradiation in a nitrogen atmosphere. Furthermore, it is effective in preventing the oxygen hindrance and promoting the formation of the structural region only by laminating the normal transparent film on the photocurable composition layer. Thus, the light irradiation through the mask or the transparent film is effective in manufacturing the anisotropic optical film according to the present embodiment.

3-2-1-3. Step 3: Step of Forming Structural Region of Anisotropic Optical Film

Next, the unit used in the step of forming the structural region of the anisotropic optical film is described with reference to FIGS. 12 and 13, and the specific formation process of the anisotropic optical film is described.

3-2-1-3-1. Unit

First, in order to manufacture the anisotropic optical film 60, as shown in FIG. 12, a light source (not shown), a light shielding plate 65, and a movable stage (not shown) are mainly used.

In addition, in order to manufacture the anisotropic optical film 70, as shown in FIG. 13, a light source (not shown), a directional diffusion element 76, a light shielding plate 75, and a movable stage (not shown) are mainly used.

The movable stage moves the coating film at a predetermined speed. The movable stage is driven by a stepping motor (not shown), a linear motor (not shown), or the like, and a moving speed, a movement direction, or the like of the movable stage is controlled by a motor driver. More specifically, in FIGS. 12 and 13, each of the coating film 64 and the coating film 74 loaded on the movable stage can be continuously moved from a position shown in a state (a) to a position shown in a state (e).

The light source irradiates the coating film with the emitted light to cause a phase separation, cures a structural region while forming the structural region, and forms an anisotropic optical film. Details of a process of forming a plurality of structures will be described later.

As the light source, generally, a short arc ultraviolet light source is usually used. Specifically, a high pressure mercury lamp, a low pressure mercury lamp, a meta halide lamp, a xenon lamp, or the like can be used.

Particularly, in the detailed process of forming a structural region (a plurality of structures) described later, the coating film needs to be irradiated with a light rays parallel to a desired scattering central axis Q. In order to obtain this parallel light D, a point light source may be disposed, and an optical lens such as a reflection mirror or a Fresnel lens for irradiating a portion between the point light source and the photocurable composition layer with the parallel light D may be disposed. The light emitted from the light source passes through this optical lens, and thus, the light emitted from the light source is converted into the parallel light D, and the coating film or the directional diffusion element can be irradiated with the parallel light D.

The light rays for irradiating a composition containing the photopolymerizable compound are required to contain a wavelength capable of curing the photopolymerizable compound, and thus, generally, light of a wavelength centered on 365 nm of a mercury lamp is used. In a case where the anisotropic optical film is manufactured using this wavelength band, an illuminance is preferably in a range of 0.01 to 100 mW/cm$^2$, and more preferably in the range of 0.1 to 20 mW/cm$^2$. If the illuminance is less than 0.01 mW/cm$^2$, curing may take a long time, which may deteriorate manufacturing efficiency. If the illuminance exceeds 100 mW/cm$^2$, the photopolymerizable compound is too fast cured, formation of the structure is not generated, and in some cases, target anisotropic diffusion characteristics cannot be exhibited.

The directional diffusion element 76 in FIG. 13 gives directivity to the parallel light D and converts the parallel light D into diffused light E. A plurality of tabular structures 73 are formed by irradiating the coating film 74 with the diffused light E. A directional diffusion element is not used in a process of manufacturing the anisotropic optical film 60 which forms a plurality of columnar structures 63 which are columnar structures.

The directional diffusion element 76 may be any element which gives the directivity to the incident parallel light D. In order to obtain the diffused light E having directivity in this way, for example, a method can be adopted in which a needle-like filler having a high aspect ratio is included in the directional diffusion element 76, and the needle-like filler is oriented to extend its major axis in the Y direction. The directional diffusion element 76 can use various methods in addition to the method using the needle-like filler. The parallel light D may be disposed so as to obtain the diffused light E through the directional diffusion element 76. A specific example of the directional diffusion element 76 is a lenticular lens or the like.

The light shielding plate blocks the light emitted from the light source and prevents the composition containing the photopolymerizable compound from being irradiated with the light. A material, a size, a thickness, or the like of the light shielding plate may be appropriately determined according to a wavelength and intensity of the light emitted from the light source.

Here, as shown in FIG. 13, the directional diffusion element 76 is disposed so as to protrude from the light shielding plate 75 in the direction along the movement direction of the coating film 74. Accordingly, it is possible to form two regions of a region AR1 where all the light emitted from the light source is blocked by the light shielding plate 75 and a region AR2 which is irradiated with the diffused light E.

Hereinafter, a specific formation process of the anisotropic optical film in each of the regions divided into the region AR1 and the region AR2 will be described.

3-2-1-3-2. Process of Region AR1

In the process in the AR1 region, the entire coating film is still covered with the light shielding plate, and the coating film is not irradiated with the light emitted from the light source. In this stage, the entire coating film is located in the region AR1. Therefore, as shown in states (a) of FIG. 12 and FIG. 13, the structural region is not formed but the entire coating film is in a non-cured state.

3-2-1-3-3. Region AR2 Process: Process of Forming Anisotropic Optical Film

If the coating film moves by a certain distance by driving the movable stage, the coating film moves from the region AR1 to the region AR2.

In the process of the region AR2, the coating film (64 or 74) is gradually exposed from the light shielding plate (65 or 75) by the driving of the movable stage. Here, the coating film (64 or 74) is located in two regions of the region AR1 and the region AR2. As the coating film (64 or 74) is exposed from the light shielding plate (65 or 75), the coating film (64 or 74) moves from the region AR1 to the region AR2. In the region AR2 of FIG. 13, the coating film 74 is irradiated with the diffused light E.

The coating film is irradiated with the parallel light D or the diffused light E, and thus, the phase separation starts from an upper surface of the coating film. By irradiation of the parallel light D or the diffused light E, a plurality of respective structures (columnar structures 63 or tabular structures 73) start to be formed from the upper surface of the coating film (64 or 74) and are gradually grown. Each matrix region (61 or 71) is also formed along with the formations of the plurality of respective structures (columnar structures 63 or tabular structures 73).

More specifically, as shown in states (b) of FIG. 12 and FIG. 13, the phase separation starts from the upper surface of the coating film (64 or 74), and the plurality of respective structures (columnar structures 63 or tabular structures 73) and each matrix region (61 or 71) start to be formed from the upper surface toward a lower surface by the phase separation. At this time, as shown in states (b) to (d) of FIG. 12 and FIG. 13, the plurality of respective structures (columnar structures 63 or tabular structures 73) and each matrix region (61 or 71) do not reach the lower surface and are formed to an intermediate position between the upper surface and the lower surface of the coating film (64 or 74). In addition, the intermediate position is not limited to a center or a center position of the upper surface and the lower surface, and indicates any position of a region interposed between the upper surface and the lower surface.

As shown in states (b) to (e) of FIG. 12 and FIG. 13, the plurality of respective structures (columnar structures 63 or tabular structures 73) and the matrix region (61 or 71) are sequentially formed from the upper surface to the lower surface of the coating film (64 or 74).

Here, in the process of FIG. 13, by adjusting irradiation intensity and a spread of the diffused light E, a size (a short diameter and a long diameter in a plane perpendicular to a scattering central axis, an aspect ratio, or the like) of the formed tabular structure 73 can be determined appropriately.

The spread of the diffused light E mainly depends on the distance between the directional diffusion element 76 and the coating film 74, a type of the directional diffusion element 76, or the like. As the distance decreases, the size of the tabular structure decreases, and as the length increases, the size of the tabular structure increases. Therefore, a size of a pillar region can be adjusted by adjusting the distance.

In the present process, it is preferable that the aspect ratio of the diffused light E is 2 or more. Aspect ratios of the plurality of tabular structures 73 are formed in a manner substantially corresponding to the aspect ratio. Since a diffusion range may be narrowed as the aspect ratio decreases, in the present embodiment, the aspect ratio is set to 2 or more. In addition, the aspect ratio is more preferably 2 or more and less than 50, still more preferably 2 or more and 10 or less, and particularly preferably 2 or more and 5 or less. By setting the above-mentioned aspect ratio to the range, light diffusivity and light condensing properties are excellent.

Moreover, in the present anisotropic optical film forming process, a total light irradiation time is not particularly limited, but is 10 to 180 seconds, more preferably 10 to 120 seconds.

The anisotropic optical film 60 and the anisotropic optical film 70 of the present embodiment are obtained by forming a specific internal structure in the photocurable composition layer by irradiation of a low illuminance light for a relatively long time as described above. Therefore, unreacted monomer components may be left only by the light irradiation to cause stickiness, which may cause problems in handling properties and durability. In this case, the remaining monomers can be polymerized by additional irradiation of light having high illuminance of 1000 mW/cm$^2$ or more. At this time, the light irradiation may be from the lower surface side (for example, a side opposite to a side on which the mask is laminated) which is the surface opposite to the light rays which are initially performed to form the anisotropic optical film of the coating film (64 or 74).

4. Use Method of Light Guide Laminate

The light guide laminate can be used as an edge type planar light source device by installing the light source on a side surface of a light guide plate. The light source can be installed on one or a plurality of side surfaces (end faces) of the light guide plate. In a case where the light sources are installed on the plurality of side surfaces, the distribution density of the dot structure on the surface of the light guide plate can be adjusted as described above. From the viewpoint of saving the size of the device, it is preferable to install the light source on one side surface.

The light source may be a known light source and is not particularly limited. For example, as the light source, there is a bar-like cold cathode tube, LED, or the like. From the viewpoint of size saving and power consumption, an LED light source is preferable.

The planar light source device can be used as a back light by providing a reflective plate with an anisotropic optical film as an intermediate layer on a light emitting surface side of the light guide plate.

The planar light source device is used as a planar light source device for a transparent type display device which is a display device and for an edge type display device in a reflective type display device.

Example

Next, the present invention will be described in more detail with reference to Examples and Comparative Examples, but the present invention is not limited by these examples.

(Manufacturing of Light Guide Plate Having Uneven Dot Structure)

A light guide plate having a concave dot structure used in the present invention was manufactured using the known nanoimprint technique.

Figure 14:
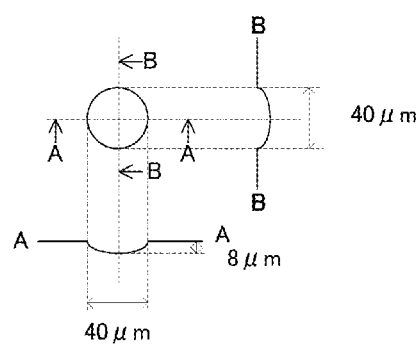
FIG. 14 is a perspective view showing a dot structure and a prism type linear groove structure of a light guide plate used in Examples and Comparative Examples.
Figure 14:
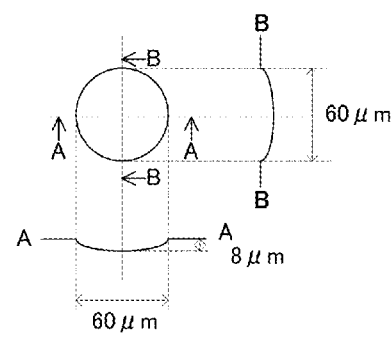
Figure 14:
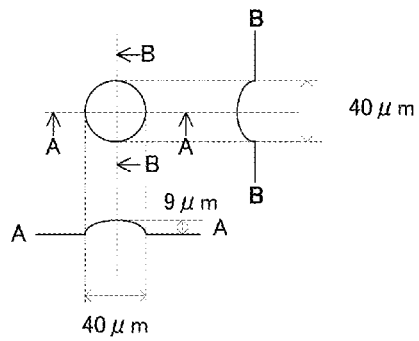
Figure 14:
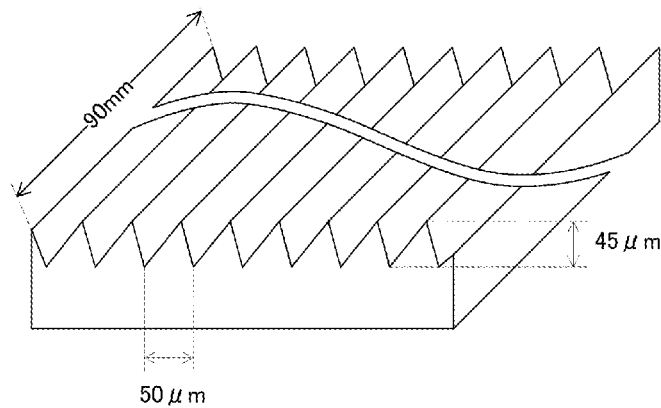

A 10 μm thick applying layer was formed of a UV curable acrylic resin (containing a photopolymerization initiator) on a 2 mm thick PMMA sheet of 130 mm×90 mm size, pressed by a metal mold (convex type lens density: about 100 pieces/mm$^2$) having a convex lens type dot structure having a diameter of about 40 μm and a height of about 10 μm, and cured by being irradiated with UV light rays from a surface opposite to the applying layer of PMMA sheet, thereby manufacturing a light guide plate A having a concave dot structure used in the present invention. A surface of the obtained light guide plate A was observed with a laser microscope, and as a result, it was confirmed that a light guide plate having a concave dot structure in which a concave lens type dot structure (FIG. 14(*a*)) having a size (diameter) of about 40 μm and a depth of about 8 μm exists at a density of about 100 pieces/mm$^2$ is obtained.

Next, a 10 μm thick applying layer was formed of a UV curable acrylic resin (containing a photopolymerization initiator) on a 2 mm thick PMMA sheet of 130 mm×90 mm size, pressed by a metal mold (convex type lens density: about 100 pieces/mm$^2$) having a convex lens type dot structure having a diameter of about 60 μm and a height of about 10 μm, and cured by being irradiated with UV light rays from a surface opposite to the applying layer of PMMA sheet, thereby manufacturing a light guide plate B having a concave dot structure used in the present invention. A surface of the obtained light guide plate B was observed with a laser microscope, and as a result, it was confirmed that a light guide plate having a concave dot structure in which a concave lens type dot structure (FIG. 14(b)) having a size (diameter) of about 60 μm and a depth of about 8 μm exists at a density of about 100 pieces/mm² is obtained.

In addition, a 10 μm thick applying layer was formed of a UV curable acrylic resin (containing a photopolymerization initiator) on a 2 mm thick PMMA sheet of 130 mm×90 mm size, pressed by a metal mold (concave type lens density: about 100 pieces/mm²) having a concave lens type dot structure having a diameter of about 40 μm and a height of about 10 μm, and cured by being irradiated with UV light rays from a surface opposite to the applying layer of PMMA sheet, thereby manufacturing a light guide plate C having a convex dot structure used in the present invention. A surface of the obtained light guide plate C was observed with the laser microscope, and as a result, it was confirmed that a light guide plate having a convex dot structure in which a convex lens type dot structure (FIG. 14(c)) having a size (diameter) of about 40 μm and a depth of about 9 μm exists at a density of about 100 pieces/mm² is obtained.

(Manufacturing of Straight Prism Type Grooved Light Guide Plate)

A grooved light guide plate used in Comparative Example was manufactured using the known nanoimprint technique. A 50 μm thick applying layer was formed of a UV curable acrylic resin (containing a photopolymerization initiator) on a 2 mm thick PMMA sheet of 130 mm×90 mm size, pressed by a metal mold having a linear prism type groove structure having a pitch of 50 μm, a height of 50 μm, and a length of 90 mm, and cured by being irradiated with UV light rays from a surface opposite to the applying layer of the PMMA sheet, thereby manufacturing a light guide plate D having a linear prism type groove structure used in Comparative Example. A surface of the obtained light guide plate D is observed with a laser microscope, and as a result, it was confirmed that the light guide plate having the linear prism type groove structure in which the linear prism type groove structure (FIG. 14 (d)) having a size (base length in a prism triangle shape) of about 50 μm and a depth of about 45 μm exists is obtained.

(Manufacturing of Planar Light Source Device Using Light Guide Plate and Evaluation of Optical Characteristics of Light Guide Plate)

The light guide plate used in the present example was a planar light source device using a light guide plate by installing five LED light sources (200 mW) on an end of a side of a light guide plate having a size of 90 mm at intervals of 15 mm.

The LED light source of the planar light source device using the light guide plate was turned on, and illuminance (emission intensity) of light emitted from near a center of a surface (hereinafter, referred to as a light emission surface, a surface on a side which is not present in a concave dot structure, a convex dot structure, or a linear prism type groove structure, a smooth surface) of a light emission side of the light guide plate was measured with a variable angle photometer goniophotometer (manufactured by Genesia Corporation) to evaluate the optical characteristics of the light guide plate. In order to avoid the influence of light from the surface (hereinafter, referred to as the opposite surface) opposite to the surface of the light emission side of the light guide plate at the time of measuring the illuminance, the illuminance was measured by bring a black felt sheet (FU-714, thickness of 2 mm) manufactured by Waki Sangyo Co., Ltd into close contact with the opposite surface.

A maximum value of an illuminance measurement value of light was set to be 100%, and a relative value of the illuminance measurement value to the maximum value at each angle of emitted light was set to be luminance (%). Furthermore, the illuminance of light emitted to the opposite surface was measured in the same manner as the illuminance of light on the light emission surface, and a division value (luminance on emission side/luminance on opposite side) of the luminance at each angle of emitted light on each surface side was set to be contrast. Table 1 shows the evaluation results of the optical characteristics of the light guide plate when the planar light source device using the light guide plate is used.

TABLE 1

| Light guide plate name | Shape | Size/depth (height) | Maximum luminance angle (°) | Contrast at maximum luminance angle | Luminance (%) at 0° | Contrast at 0° |
| --- | --- | --- | --- | --- | --- | --- |
| Light guide plate A | Concave lens type dot structure | 40 μm/8 μm | About 45 | 5.5 | 5 | 7.5 |
| Light guide plate B (Comparative Example) | Concave lens type dot structure | 60 μm/8 μm | About 63 | 3.7 | 3 | 12.4 |
| Light guide plate C | Convex lens type dot structure | 40 μm/9 μm | About 40 | 4.5 | 6 | 3.2 |
| Light guide plate D (Comparative Example) | Linear prism type groove structure | 50 μm/45 μm | About 18 | 11.2 | 39 | 13.9 |

(Manufacturing of Anisotropic Optical Film)

In a method of manufacturing an anisotropic optical film (LCF 1 to 10), first, an anisotropic optical film (LCF 1 to 10) having a structure and characteristics described in Table 2 was manufactured by changing various conditions with reference to WO 2015/111523 disclosing a columnar structure, subsequently JP 2015-127819 A disclosing a tabular structure, and gazettes and JP 2013-182227 A disclosing a tabular structure for LCF 9 (structure in which a scattering central axis angle of the anisotropic optical film is continuously changed in a plane).

(Characteristic Evaluation of Anisotropic Optical Film)

The characteristic evaluation of the manufactured anisotropic optical films (LCF 1 to 10) was carried out as follows.

(Aspect Ratio)

After a surface (irradiated light side at the time of ultraviolet irradiation) of the anisotropic optical film of Examples and Comparative Examples was observed with an optical microscope to measure a long diameter LA and a short diameter SA of 100 arbitrary structures and calculate each average value, an aspect ratio (average long diameter/average short diameter) was calculated based on the calculated average long diameter and average short diameter.

(Scattering Central Axis Angle, Linear Transmittance and Diffusion Range of 0°)

As shown in FIG. 9, the optical characteristics of the anisotropic optical films of Examples and Comparative Examples were evaluated using a variable angle photometer goniophotometer (manufactured by Genesia Corporation). A detector was fixed at a position where straight progressing light from a fixed light source is received, and the anisotropic optical films obtained in Examples and Comparative Examples were set in the sample holder therebetween. As shown in FIG. 9, a sample is rotated about a rotation axis (L) to measure the linearly transmitted light corresponding to each angle of incident light (including 0° where the straight progressing light is the normal direction of the plane of the anisotropic optical film) to obtain the linear transmittance. Here, the rotation axis (L) shown in FIG. 9 is the same axis as a TD direction in each structure shown in FIG. 8. In addition, the amount of linearly transmitted light was measured in the wavelength of the visible light region which uses a luminous efficacious filter.

An optical profile was produced based on the linear transmittance, the angle of incident light having a substantial symmetry was set as the scattering central axis angle by the optical profile, the angle range of incident light for which the linear transmittance is 30% or less was determined, and this range was set as the diffusion range.

The structures and characteristic evaluation results of the anisotropic optical films (LCF 1 to 10) manufactured as described above are shown in Table 2.

TABLE 2

| Anisotropic optical film | Structure | Aspect ratio | Scattering central axis angle (°) | Linear transmittance (%) of 0° | Diffusion range (°) |
|---|---|---|---|---|---|
| L C F 1 | Pillar | 1 | 15° | 8 | −15~45 |
| L C F 2 | Pillar | 1 | 25° | 33 | −5~55 |
| L C F 3 | Pillar | 1 | 35° | 42 | 5~65 |
| L C F 4 | Plate shape | 45 | 30° | 63 | 15~45 |
| L C F 5 | Plate shape | 45 | 40° | 81 | 25~55 |
| L C F 6 | Plate shape | 3 | 25° | 53 | 10~45 |
| L C F 7 | Plate shape | 3 | 35° | 62 | 20~55 |
| L C F 8 | Plate shape | 3 | 42° | 66 | 27~62 |
| L C F 9 ※ | Plate shape | 3 | 25~35° | 50~60 | 10~55 |
| L C F 10 (Comparative Example) | Plate shape | 3 | 15° | 16 | −5~35 |

* In the anisotropic optical film of LCF 9, the scattering central axis angle is continuously changed within a plane in the range.

(Manufacturing of Light Guiding Laminate)

A light guiding laminates of Examples 1 to 10 and Comparative Examples 1 to 7 were obtained by adhering an adhesive layer (25 μm in thickness) made of a known transparent acrylic adhesive is stuck to the light emission surface of the obtained light guide plate (light guide plates A to D) and then sticking the anisotropic optical films (LCF 1 to 10) on the surface of the adhesive layer by the combination shown in Table 3.

The types of light guide plate and anisotropic optical film, the difference (Y−X) between the maximum luminance angle (hereinafter, referred to as Y) of the light guide plate shown in Table 1, and the scattering central axis angle (hereinafter, referred to as X) of the anisotropic optical film shown in Table 2, and the linear transmittance of the anisotropic optical film at the maximum luminance angle of the light guide plate are shown in Table 3. The linear transmittance of the anisotropic optical film at the maximum luminance angle of the light guide plate was the linear transmittance at the maximum luminance angle of the light guide plate described in Table 1 in the optical profile of the anisotropic optical film.

TABLE 3

| | Light guide plate | | Anisotropic optical film | | | Linear |
|---|---|---|---|---|---|---|
| Example | Type | Y: Maximum luminance angle (°) | Type | X: Scattering central axis angle (°) | Y − X (°) | transmittance (%) at maximum luminance angle |
| Example 1 | Light guide plate A | 45 | LCF1 | 15 | 30 | Less than 30 |
| Example 2 | Light guide plate A | 45 | LCF2 | 25 | 20 | Less than 30 |
| Example 3 | Licht guide plate A | 45 | LCF3 | 3 | 10 | Less than 30 |
| Example 4 | Light guide plate A | 45 | LCF4 | 20 | 25 | Less than 30 |
| Example 5 | Light guide plate A | 45 | LCF5 | 30 | 15 | Less than 30 |
| Example 6 | Light guide plate A | 45 | LCF6 | 25 | 20 | Less than 30 |
| Example 7 | Light guide plate A | 45 | LCF7 | 35 | 10 | Less than 30 |
| Example 8 | Light guide plate A | 45 | LCF8 | 42 | 3 | Less than 30 |
| Example 9 | Light guide plate C | 40 | LCF7 | 35 | 15 | Less than 30 |
| Example 10 | Light guide plate C | 40 | LCF9 | 25~35 | 5~15 | Less than 30 |
| Comparative Example 1 | Light guide plate A | 45 | — | — | — | — |
| Comparative Example 2 | Light guide plate A | 45 | LCF10 | 15 | 30 | Exceeding 30 |
| Comparative Example 3 | Light guide plate B | 63 | None | — | — | — |
| Comparative Example 4 | Light guide plate B | 63 | LCF7 | 35 | 10 | Less than 30 |
| Comparative Example 5 | Light guide plate D | 18 | — | — | — | — |
| Comparative Example 6 | Light guide plate D | 18 | LCF1 | 15 | 3 | Less than 30 |
| Comparative Example 7 | Light guide plate D | 18 | LCF7 | 35 | 10 | Less than 30 |

(Manufacturing of Planar Light Source Device Using Light Guide Laminate and Evaluation of Optical Characteristics of Light Guide Laminate)

The evaluation of the light guiding laminate was performed by manufacturing the planar light source device using the light guiding laminate instead of the light guide plate in the same manner as the manufacturing of the planar light source device using the light guide plate and the evaluation of the optical characteristics of the light guide plate (however, the light source was installed on the light guide plate of the light guiding laminate in the same manner as in the manufacturing of the planar light source device using the light guide plate). The evaluation results are shown in Table 4.

TABLE 4

| Example | Maximum luminance angle (°) | Contrast at maximum luminance angle | Luminance (%) at 0° | Contrast at 0° |
| --- | --- | --- | --- | --- |
| Example 1 | 21 | 20.1 | 45 | 19.2 |
| Example 2 | 26 | 22.4 | 44 | 23.7 |
| Example 3 | 33 | 21.2 | 40 | 25.6 |
| Example 4 | 19 | 32.4 | 55 | 39.5 |
| Example 5 | 28 | 35.2 | 60 | 40.4 |
| Example 6 | 21 | 27.2 | 68 | 28.5 |
| Example 7 | 30 | 33.6 | 65 | 35.1 |
| Example 8 | 39 | 25.3 | 51 | 33.6 |
| Example 9 | 31 | 34.1 | 49 | 23.0 |
| Example 10 | 26 | 29.4 | 57 | 24.2 |
| Comparative Example 1 | 45 | 5.5 | 5 | 7.5 |
| Comparative Example 2 | 42 | 5.0 | 6 | 8.1 |
| Comparative Example 3 | 63 | 3.7 | 3 | 12.4 |

TABLE 4-continued

| Example | Maximum luminance angle (°) | Contrast at maximum luminance angle | Luminance (%) at 0° | Contrast at 0° |
| --- | --- | --- | --- | --- |
| Comparative Example 4 | 48 | 7.1 | 8 | 13.2 |
| Comparative Example 5 | 18 | 11.2 | 39 | 13.9 |
| Comparative Example 6 | 16 | 14.3 | 47 | 1.4 |
| Comparative Example 7 | 13 | 16.7 | 54 | 2.0 |

(Evaluation of Visibility of Light Guiding Laminate)

In the evaluation of visibility, after the light guide plate in the planar light source device using the light guiding laminate is in a lighting state, the light guiding laminate was visually observed from the normal direction of the surface on the light emission surface of the light guide plate to evaluate a glare feeling and in-plane uniformity of luminance in the surface of the light emission side of the light guiding laminate. In addition, a glass plate of 2 mm in thickness was placed on a white paper on which a black dot pattern having a diameter of 0.25 mm and a pitch of 0.5 mm is printed, and the light guiding laminate overlays in such a manner that the light emission surface is a glass plate side and was visually observed from the normal direction of the opposite surface, and it was evaluated based on a blurring feeling whether the printed dot pattern could be clearly confirmed. In addition, the glare feeling and the blurring feeling were evaluated not only when the light guide plate was in the lighting state, but also when the light guide plate in the non-lighting state.

The indexes of the glare feeling, the blurring feeling, and the in-plane uniformity of luminance by summarizing each evaluation item were determined by five persons at five stages from 1: poor (glare tends to occur, blurring tends to occur, luminance is non-uniform in a plane) to 5: good (glare is difficult to occur, blurring is difficult to occur, in-plane uniformity of luminance is good), and the average value of the determination of five persons were set to be the evaluation point. The evaluation results are shown in Table 5.

TABLE 5

| | Glare feeling | | Blurring feeling | | In-plane uniformity |
| --- | --- | --- | --- | --- | --- |
| Example | Lighting state | Non-lighting state | Lighting state | Non-lighting state | of luminance Lighting state |
| Example 1 | 4.4 | 4.6 | 3.2 | 3.0 | 3.2 |
| Example 2 | 4.6 | 4.6 | 3.4 | 3.4 | 3.4 |
| Example 3 | 5.0 | 5.0 | 4.0 | 4.0 | 3.4 |
| Example 4 | 4.0 | 4.0 | 4.2 | 3.8 | 3.0 |
| Example 5 | 4.6 | 4.6 | 4.2 | 4.9 | 3.0 |
| Example 6 | 4.6 | 4.6 | 4.4 | 3.8 | 3.8 |
| Example 7 | 5.0 | 5.0 | 4.4 | 4.0 | 3.8 |
| Example 8 | 4.6 | 5.0 | 4.6 | 4.0 | 3.4 |
| Example 9 | 4.2 | 4.4 | 4.9 | 4.0 | 3.2 |
| Example 10 | 4.6 | 4.6 | 4.2 | 4.0 | 4.6 |
| Comparative Example 1 | 3.2 | 3.2 | 4.6 | 4.2 | 2.0 |
| Comparative Example 2 | 1.4 | 1.6 | 4.0 | 4.0 | 2.2 |
| Comparative Example 3 | 1.6 | 1.4 | 2.4 | 1.6 | 1.6 |
| Comparative Example 4 | 1.0 | 1.0 | 3.0 | 2.8 | 2.4 |
| Comparative Example 5 | 1.8 | 2.2 | 3.0 | 3.0 | 1.2 |
| Comparative Example 6 | 2.2 | 3.2 | 2.4 | 2.6 | 2.2 |
| Comparative Example 7 | 2.4 | 3.2 | 2.8 | 2.2 | 2.0 |

(Action Effect)

As shown in Table 4, Compared with Comparative Examples 1 to 4, in Examples of the present invention, the maximum luminance angle was close to the normal direction (light emission surface 0° of the light guiding laminate), an operation is effective only at a viewing angle, and contrast at the maximum luminance angle, luminance at 0°, and contrast at 0° were larger in numerical values compared with Comparative Examples 1 to 4, and excellent lighting could be obtained.

In particular, in Examples 5 and 7, since from Table 2, the linear transmittance at 0° is 60% or more and from Table 3, the difference (X−Y) between the maximum luminance angle of the light guide plate and the scattering central axis is in the range of 5 to 20°, it is considered in Table 4 that it is possible to obtain the contrast at 0° which is higher in Examples.

On the other hand, by using the light guide plate of the linear prism type groove structure (FIG. 14(d)) in Comparative Examples 5 to 7, in Table 4, the maximum luminance angle was excellent as it is close to the normal direction, but the contrast at the maximum luminance angle and the contrast at 0° were lower in numerical values compared with Examples, and lighting was inferior compared with Examples.

Furthermore, as shown in Table 5, even in terms of visibility in Examples of the present invention, compared with Comparative Examples 1 to 7, it is possible to suppress the glare feeling and the blurring feeling in a well-balanced manner, and when Examples 1 to 7 are used for lighting the display, the in-plane uniformity of the luminance is excellent as well as the image visibility is not impaired, so the utilization efficiency of the light source was good and the lighting could be excellent.

In particular, in Example 10, it is considered that excellent in-plane uniformity can be obtained because the anisotropic optical film in which the scattering central axis is continuously changed is used.

As described above, in Examples of the present invention, the excellent lighting can be obtained, but in particular, Example 7 was excellent in all evaluations on the light guiding laminate, had high luminance at 0°, the contrast at the maximum luminance angle and 0°, and was excellent in high visibility.

REFERENCE SIGNS LIST 1, 11, 21, 31, 41, 51, 300, 310 Light source
2 Detector
10, 20, 30 Planar light source device
12, 22, 32, 42, 52, 101a to 101d, 109a, 109b Light guide plate
13, 23 Prism lens
24 Diffusion film
34 Anisotropic scattering film
43, 53 Light emission surface
54 Processed portion
60, 70, 103 Anisotropic optical film
61, 71 Matrix region
63 Pillar structure
64, 74 Coating film
65, 75 Light shielding plate
73 Louver structure
76 Directional diffusion element
100, 110, 120, 130, 140, 150 Light guiding laminate
104 Retardation plate
105 Polarizing plate
106 Reflector
107 Sealing member
108 Prism array structure
109(a)-1 to (a)-7 Concave dot structure
111 Groove structure

The invention claimed is:

1. A light guiding laminate, comprising:
a light guide plate that has two surfaces in parallel, which are a light emission surface and an opposite surface that is on an opposite side to the light emission surface of the light guide plate, and an end face, which is located at edges of the light emission surface and the opposite surface and intervenes therebetween, wherein
light incident from the end face, running through the light emission surface, is bent and emitted in a surface direction of the light emission surface,
an angle at which emission intensity at the light emission surface is maximum, and
the angle is 20° to 60° with respect to a perpendicular direction to the light emission surface; and
an anisotropic optical film which is laminated directly or via another layer and has diffusibility changing depending on an angle of incident light with respect to the light emission surface, wherein
the opposite surface has a plurality of concave or convex structures having a size of 50 μm or less and a height or a depth of 50 μm or less,
the anisotropic optical film has a matrix region and a structural region formed of a plurality of structures,
linear transmittance of the anisotropic optical film, which is an amount of transmitted light in a linear direction of light incident on the anisotropic optical film/an amount of incident light, is 30% or less at an angle at which the emission intensity of the light guide plate is maximum, and
the linear transmittance in the normal direction of the anisotropic optical film is 60% or more.

2. The light guiding laminate according to claim 1, wherein a scattering central axis angle with respect to a normal direction of the anisotropic optical film is inclined toward the normal direction with respect to the angle at which the emission intensity is maximum, and a difference between the scattering central axis angle and the angle at which the emission intensity is maximum is within 20°.

3. The light guiding laminate according to claim 2, wherein the scattering central axis angle is continuously changed from a position close to the light source to a position far from the light source.

4. The light guiding laminate according to claim 3, wherein the plurality of structures of the anisotropic optical film have a plate shape.

5. The light guiding laminate according to claim 3, wherein a structure of the opposite surface of the light guide plate has a concave shape.

6. The light guiding laminate according to claim 3, wherein the concave or convex structure is sealed, and an inside of the sealing is filled with at least one of gas, liquid, solid, and vacuum.

7. The light guiding laminate according to claim 2, wherein the plurality of structures of the anisotropic optical film have a plate shape.

8. The light guiding laminate according to claim 2, wherein a structure of the opposite surface of the light guide plate has a concave shape.

9. The light guiding laminate according to claim 2, wherein the concave or convex structure is sealed, and an inside of the sealing is filled with at least one of gas, liquid, solid, and vacuum.

10. The light guiding laminate according to claim 2, wherein the other layer is at least one of a polarizing plate, a retardation plate, or both of them.

11. A planar light source device comprising:
the light guiding laminate according to claim 2; and
a light source.

12. The light guiding laminate according to claim 1, wherein the plurality of structures of the anisotropic optical film have a plate shape.

13. The light guiding laminate according to claim 1, wherein a structure of the opposite surface of the light guide plate has a concave shape.

14. The light guiding laminate according to claim 1, wherein the concave or convex structure is sealed, and an inside of the sealing is filled with at least one of gas, liquid, solid, and vacuum.

15. The light guiding laminate according to claim 1, wherein the other layer is at least one of a polarizing plate, a retardation plate, or both of them.

16. A planar light source device comprising:
   the light guiding laminate according to claim 1; and
   a light source.

* * * * *